United States Patent [19]
Kamata et al.

[11] Patent Number: 5,953,050
[45] Date of Patent: Sep. 14, 1999

[54] MULTI-LOCATION VIDEO CONFERENCING SYSTEM

[75] Inventors: Hajime Kamata; Youichi Ashida, both of Kanagawa, Japan

[73] Assignee: Fujitsu Limited, Kanagawa, Japan

[21] Appl. No.: 08/757,805

[22] Filed: Nov. 27, 1996

[30] Foreign Application Priority Data

Nov. 27, 1995 [JP] Japan ................................ 7-306980

[51] Int. Cl.$^6$ ...................................................... H04N 7/14
[52] U.S. Cl. ............................ 348/15; 379/93.21; 348/14
[58] Field of Search ................................ 348/13, 14, 15, 348/16, 17, 93.21, 202; 379/93.17, 93.21, 93.23, 201, 202

[56] References Cited

U.S. PATENT DOCUMENTS 4,962,521  10/1990  Komatsu et al. ......................... 379/53
5,382,972   1/1995  Kannes ..................................... 348/16
5,598,351   1/1997  Chater et al. ............................ 345/15

*Primary Examiner*—Paul Loomis
*Assistant Examiner*—Melur Ramakrishnaiah
*Attorney, Agent, or Firm*—Helfgott & Karas, P.C.

[57] ABSTRACT

A video conferencing system uses video conferencing terminals at a number of locations to allow each of participants in a video conference to watch other participants he or she wants to watch in a desired array using a small amount of hardware. The system comprises first image reduction and storage units for reducing images from the terminals at a reduction ratio for speaker's image and storing the reduced images, second image reduction and storage units for reducing the images from the terminals at a reduction ratio for non-speaker's image and storing the reduced images, image readout control units for reading the reduced image stored in a corresponding one of the second image reduction and storage units in such a way that a plurality of reduced images identical to that reduced image can be displayed on one display screen, and an image selecting and combining unit for generating a composite image and outputting it to receiving terminals.

28 Claims, 32 Drawing Sheets

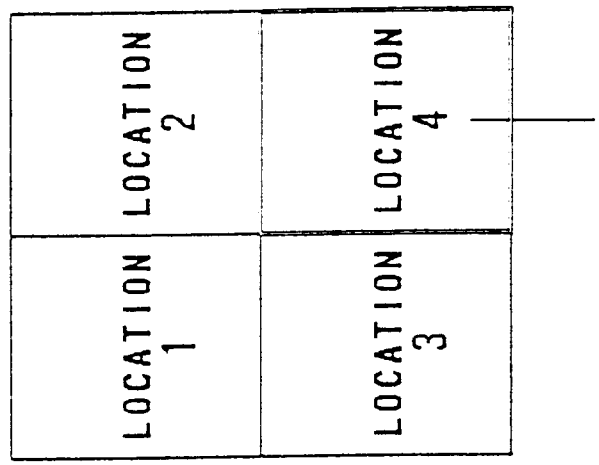
FIG-2B (SPEAKER IS DISPLAYED EMPHASIZED)
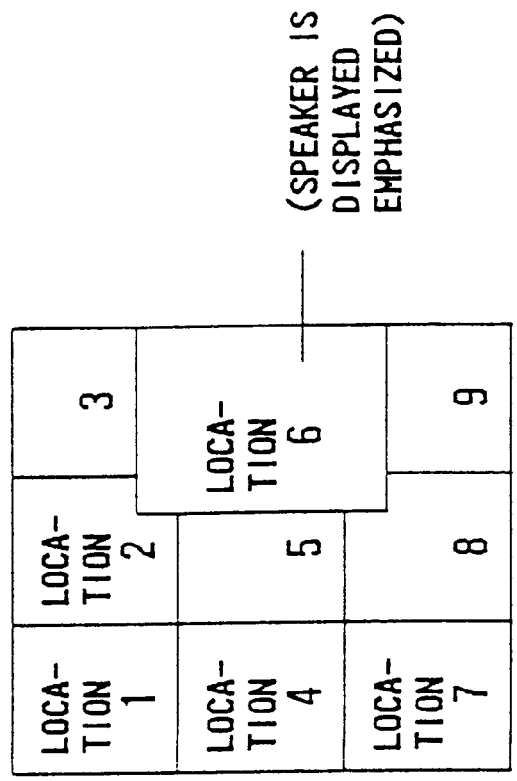
FIG-2A (SPEAKER IS DISPLAYED EMPHASIZED)

A: BROADCASTING TERMINAL

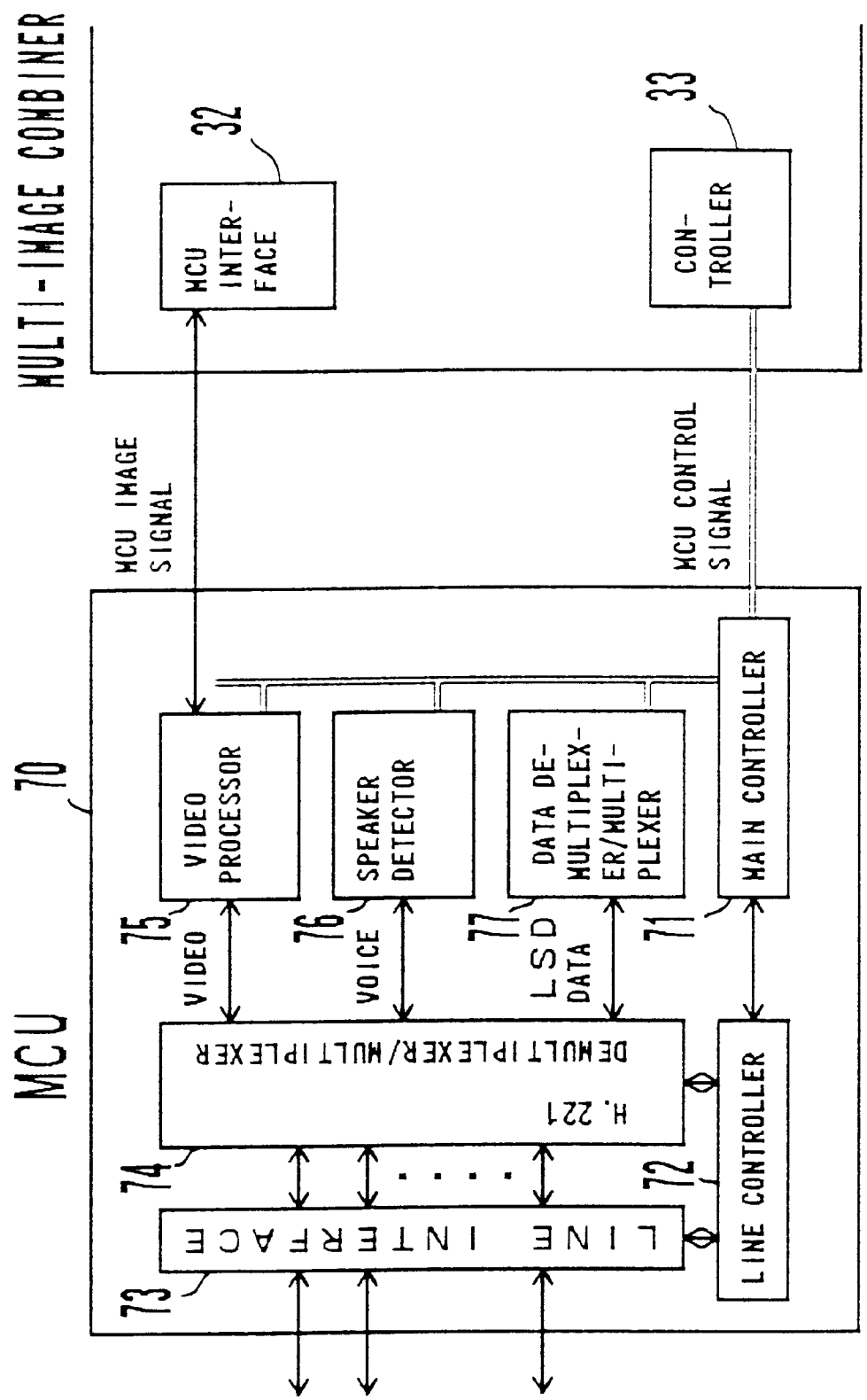
F I G. 12

SPEAKER SHIFTS
FROM ♠ TO ♦

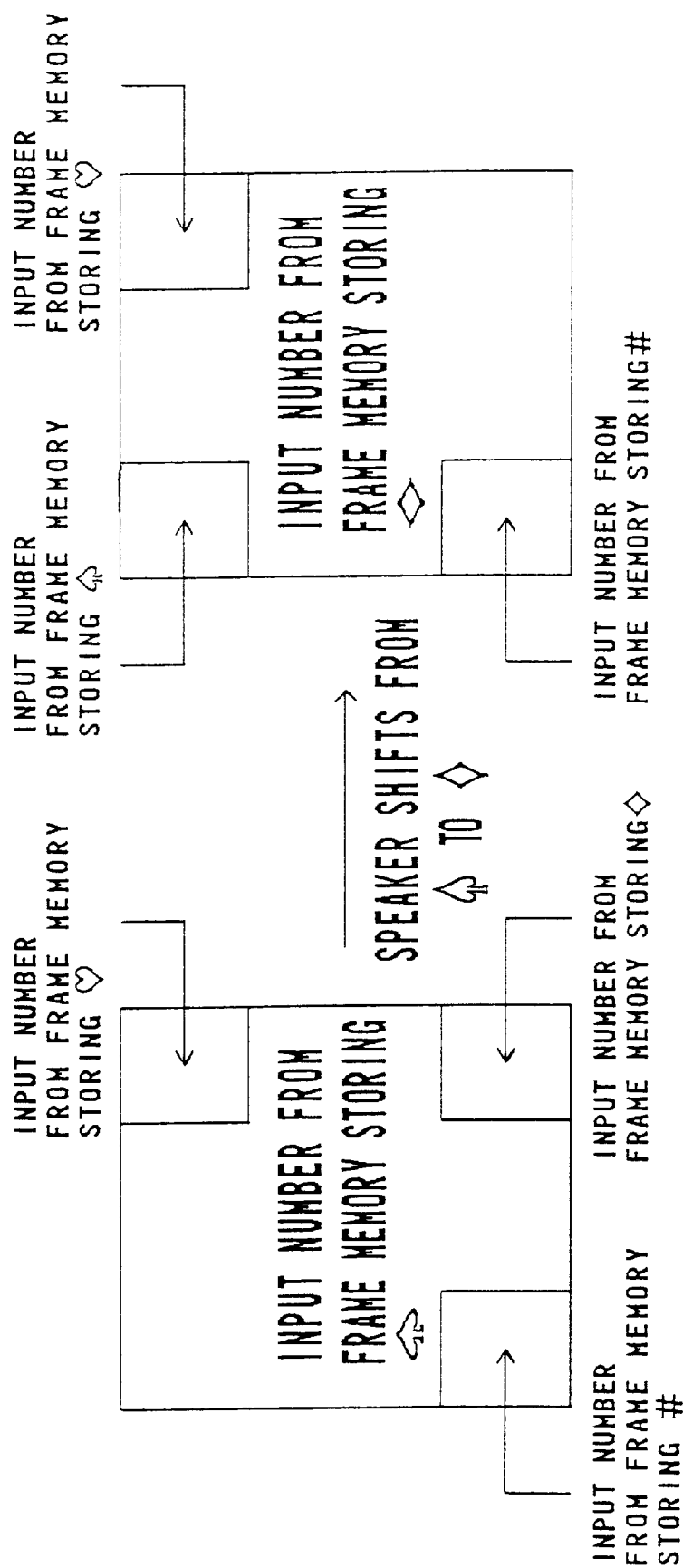

| BAS TYPE | CONTENTS | NOTIFI-CATION DIREC-TION | UNIQUE BAS (HEX) ADDITIONAL INFORMATION | NOTE |
|---|---|---|---|---|
| CAPA-BILITY | STILL IMAGE CAPABILITY | M——T | 10 | |
| | FD DATA TRANSMIT CAPABILITY | M——T | 20 | |
| COMMAND | STILL IMAGE TRANSMIT REQUEST | M——T | 11  $S_1, S_2$ | SIZE (2 bytes) |
| | STILL IMAGE TRANSMIT PERMISSION | M——T | 12 | |
| | STILL IMAGE TRANSMIT REJECTION | M——T | 13 | |
| | STILL IMAGE TRANSMIT START NOTIFICATION | M——T | 14  $C_1, C_2, \ldots, C_n$ | COMMENT ($_n$:MAX 12bytes) |
| | STILL IMAGE TRANSMIT TERMINATION NOTIFICATION | M——T | 15 | |
| | REGISTERED STILL IMAGE LIST REQUEST | M——T | 16 | |
| | REGISTERED STILL IMAGE LIST NOTIFICATION | M——T | 17  $(N_0) N_1, N_2, \ldots, N_n$ | ITEM NUMBER INFORMATION $_n$:MAX 250 |
| | REGISTERED STILL IMAGE DETAIL REQUEST | M——T | 18  N | ITEM NUMBER |
| | REGISTERED STILL IMAGE DETAIL NOTIFICATION | M——T | 19  $N, S_1, S_2, C_1, \ldots, C_n$ | ITEM NUMBER, SIZE, COMMENT |
| | REGISTERED STILL IMAGE RECEIVE REQUEST | M——T | 1A  N | ITEM NUMBER |
| | REGISTERED STILL IMAGE RECEIVE PERMISSION | M——T | 1B  N | ITEM NUMBER |
| | REGISTERED STILL IMAGE RECEIVE REJECTION | M——T | 1C  N | ITEM NUMBER |
| | REGISTERED STILL IMAGE DELETE REQUEST | M——T | 1D  N | ITEM NUMBER |
| | REGISTERED STILL IMAGE DELETE PERMISSION | M——T | 1E  N | ITEM NUMBER |
| | REGISTERED STILL IMAGE DELETE REJECTION | M——T | 1F  N | ITEM NUMBER |
| | FD DATA TRANSMISSION REQUEST | M——T | 21  $S_1, S_2$ | SIZE(2bytes) |
| | FD DATA TRANSMISSION PERMISSION | M——T | 22 | |
| | FD DATA TRANSMISSION REJECTION | M——T | 23 | |
| | FD DATA TRANSMIT START NOTIFICATION | M——T | 24  $C_1, C_2, \ldots, C_n$ | COMMENT ($_n$:MAX 12bytes) |
| | FD DATA TRANSMIT TERMINATION NOTIFICATION | M——T | 25 | |
| | REGISTERED FD DATA LIST REQUEST | M——T | 26 | ITEM NUMBER |
| | REGISTERED FD DATA LIST NOTIFICATION | M——T | 27  $(N_0) N_1, N_2, \ldots, N_n$ | ITEM NUMBER $_n$:MAX 250 |
| | REGISTERED FD DATA DETAIL REQUEST | M——T | 28  N | ITEM NUMBER |
| | REGISTERED FD DATA DETAIL NOTIFICATION | M——T | 29  $N, S_1, S_2, C_1, \ldots, C_n$ | ITEM NUMBER, SIZE, COMMENT |
| | REGISTERED FD DATA RECEIVE REQUEST | M——T | 2A  N | ITEM NUMBER |
| | REGISTERED FD DATA RECEIVE PERMISSION | M——T | 2B  N | ITEM NUMBER |
| | REGISTERED FD DATA RECEIVE REJECTION | M——T | 2C  N | ITEM NUMBER |
| | REGISTERED FD DATA DELETE REQUEST | M——T | 2D  N | ITEM NUMBER |
| | REGISTERED FD DATA DELETE PERMISSION | M——T | 2E  N | ITEM NUMBER |
| | REGISTERED FD DATA DELETE REJECTION | M——T | 2F  N | ITEM NUMBER |

FIG. 29

MULTI-LOCATION VIDEO CONFERENCING SYSTEM

BACKGROUND OF THE INVENTION

1. Field of the Invention

The invention relates to a video conferencing system which allows participants to hold a video conference through their respective terminals, and more specifically, to a multi-location video conferencing system in which video conferencing terminals at a plurality of locations are linked together by a multi-location video conferencing control unit.

2. Description of the Related Art

FIG. 1 illustrates an arrangement of a multi-location video conferencing system in which video conferencing terminals at a plurality of locations are linked to a multi-location video conferencing control unit through a network. In this figure, a plurality of video conferencing terminals 1 are linked through an ISDN 2 to a multi-location video conferencing control unit (MCU) 3, which, in turn, is connected to a multi-image combiner 4.

The system of FIG. 1 is arranged such that video images sent from the video conferencing terminals 1 at the plurality of locations are combined by the multi-image combiner 4 and the resulting composite image is then returned to the video conferencing terminals 1 through an MCU3 and ISDN2, thereby allowing participants to hold a video conference while watching the composite image.

FIGS. 2A and 2B show examples of composite images in such a video conferencing system. FIG. 2A shows an example of a composite image in a video conference among nine locations. Of participants in the conference, the participant at location 6 is speaking and so the image from that location is displayed larger than images from the other locations to thereby put emphasis on the speaker.

FIG. 2B shows an example of a composite image in a conference among four locations. In this case, that the participant at location 4 is speaking is emphasized by contrasting the image from location 4 with the others. Conventionally, video conferences are held in such a way that participants at all locations watch the same composite image.

FIG. 3 is a circuit block diagram of the multi-image combiner 4 in the conventional system in which the participants at all locations watch the same composite image as described above. The multi-image combiner is constructed from an MCU interface 10 that receives and sends image signals to the multi-location video conferencing control unit (MCU) 3, a controller 11 that receives and sends control signals to the MCU 3 to control the combination of images, reduced image creation units 12 each of which corresponds to a respective one of the video conferencing terminals and creates a reduced image that is a part of a composite image, and a readout mediation unit 13 that reads reduced images from the respective locations to create a composite image.

A number n of reduced image creation units 12 are identical in arrangement. Each of the reduced image creation units 12 comprises a CODEC (CODER/DECODER) 15 which decodes and encodes an image from a corresponding terminal and a composite image to be sent to the terminals, two image reduction units (1) 16 and (2) 17 for reducing an image sent from a corresponding terminal, and two frame memories FM (1) 18 and FM (2) 19 for storing reduced images output from the respective image reduction units 16 and 17.

As described previously in conjunction with FIG. 2A, since an image from a terminal at a site where the current speaker is located is displayed larger than images from other terminals, each of the image reduction units 16 and 17 has a different ratio of reduction. Supposing that the image reduction unit 16 reduces an image from a terminal on the speaker side, the image reduction unit (2) 17 reduces an image from a terminal on the non-speaker side. That is, an image reduced by the image reduction unit (1) 16 becomes larger than an image reduced by the image reduction unit 17. The images reduced by the image reduction units 16 and 17 are stored in the frame memories 18 and 19, respectively. The reading of images from the frame memories is controlled by the readout mediation unit 13.

For example, suppose that the reduced image creation unit #1 corresponds to location 6 shown in FIG. 2A. Then, the reduced image of the speaker at location 6 is read from the frame memory 18 so that it will be brought into a specific position in the composite image. The reduced image stored in the frame memory (2) 19 is not used in the composite image. The composite image is encoded by the CODEC 15 in the corresponding reduced image creation unit 12. The composite images corresponding to the n terminals are multiplexed by the MCU interface 10, which is in turn sent to the MCU 3.

As an alternative, there is a system in which an image from a broadcasting terminal is distributed to all other locations by the multi-location video conferencing control unit 3 instead of combining images from the locations by the image combiner as described in conjunction with FIG. 1. FIG. 4 shows an arrangement of such a multi-location video conferencing system.

In this figure, three video conferencing terminals A, B and C are linked to MCU 3 and an image from the terminal A is distributed to the terminals B and C. In such a system, the MCU3 may detect the level of a voice signal from each terminal to thereby determine the terminal having the maximum voice level as the speaker end, or the speaker end may be determined by a suitable command or control from the chairperson's terminal. Further, each terminal is allowed to select an image from a terminal other than the speaking end. Such control is implemented by image switching, distribution and control by the MCU3.

Thus, conventional multi-location video conferencing systems include systems in which a multi-image combiner is used to combine images from a number of terminals at different locations and a resulting composite image is returned to the terminals, and systems in which a multi-location video conferencing control unit (MCU3) is used to distribute only an image from a location where the current speaker is located to all other locations. Problems with the systems in which the multi-image combiner is used will be described first.

In the multi-image-combiner based systems, images from all the terminals of participants in the conference are combined and the same composite image is distributed to all the terminals. For this reason, a problem arises in that a participant in the conference is not generally able to specify a participant or participants he or she wants to watch, so as to be able to watch a composite image in which images are arranged as he or she desires.

It is by no means impossible with the conventional systems to fulfill the demand from each participant in the conference to watch a participant or participants he or she wants to watch in a desired image arrangement. To fulfill such a demand, however, a huge amount of hardware would be required. That is, for n locations, n sets of n reduced image creation units 12 and one readout mediator 13 would be required.

With the conventional systems using the multi-image combiner, as described in conjunction with FIGS. 2A and 2B, a speaker and other participants are displayed in a distinguishable manner by displaying the speaker's image a little larger than the images of the other participants or making the frame of the speaker's image more noticeable. However, the portion in which the speaker is displayed is not separated definitely from other portions in which other participants are displayed. Thus, a problem arises in that it is not necessarily easy to understand by intuition a change in the speaker.

In the system that does not use the multi-image combiner as shown in FIG. 4, display is made on the basis that an image from a broadcasting terminal at a site where the current speaker is located is distributed to the other terminals. Thus, images sent to the multi-location video conferencing control unit (MCU3) from terminals other than the terminal of the speaker are not used in the MCU and consequently discarded, resulting in a waste of image transmission from terminals other than a broadcasting terminal.

SUMMARY OF THE INVENTION

The invention is directed to a multi-location video conferencing system which is equipped with a multi-image combining unit which combines image data sent from video conferencing terminals at a number of locations and sends back a resulting composite image to the terminals. The invention is also directed to a multi-location conference control unit for only switching image data sent from the video conferencing terminals for distribution.

A first object of the invention is to provide a multi-image combining unit which allows each of participants in a video conference to watch images of at least the participants he or she wants to see in a desired image arrangement, with the use of a relatively small amount of hardware.

A second object of the invention is to provide an image combining method which combines a speaker's image and non-speakers' images such that they are separated definitely, for example, in such a way that at a time of a change of speaker, all participants can understand by intuition who has become the current speaker.

A third object of the invention is to, in a system in which a multi-location video conferencing control unit MCU distributes an image from a broadcasting terminal to other terminals without combining images from the other terminals, allow each of the terminals of which images are not being used in the MCU to send unique data such as floppy-disk data to the MCU using the image transmission band, and for other terminals to utilize the unique data as needed to thereby provide efficient utilization of the transmission band for unused images and improve the line utilization.

In the multi-image combining unit of the invention, a first image reduction and storage unit reduces an image from a speaker terminal that is transmitting an image of the current speaker in a video conference and stores the reduced image. One or more second image reduction and storage units reduce images from non-speaker terminals that are transmitting images of participants other than the speaker and store the reduced images.

Each of image readout control units, each provided for one second image reduction and storage unit, reads a reduced image stored in a corresponding one of the second image reduction and storage units in such a way that a plurality of images identical to that reduced image are displayed on one display screen.

An image selecting and combining unit is responsive to an image arrangement specify signal from each terminal to receive a composite image, to select one of an output of the first image reduction and storage unit and outputs of the second image reduction and storage units for each of the pixels forming the composite image to thereby create the composite image. The composite image is sent back to the receiving terminals.

Thus, the invention allows a composite image created as specified by each receiving terminal to be sent to it.

In a multi-location video conferencing system provided with a multi-location video conferencing control unit, each terminal is equipped with a unique data input/output unit and an terminal image data/unique data selector. The unique data input/output unit receives unique data other than video conferencing image data to be sent to the multi-location video conferencing control unit and outputs unique data other than image data sent from the multi-location video conferencing control unit.

The terminal image data/unique data selector in the terminal selects either of video conferencing image data or unique data input by the unique data input/output unit for transmission to the multi-location video conferencing control unit using the transmission band of the video conferencing image data.

The multi-location video conferencing control unit has a unique data storage unit and a terminal image data/unique data selector. The unique data storage unit stores unique data sent from terminals. The terminal image data/unique data selector selects either of video conferencing image data or unique data from the unique data storage unit for transmission to the image data/unique data selector in a terminal using the image data transmission band.

Thus, the invention allows the multi-location video conferencing control unit to store unique data from a terminal as requested by it and the other terminals to utilize the stored unique data.

BRIEF DESCRIPTION OF THE DRAWINGS

FIG. 2A shows an example of a conventional speaker's image weighted display in a video conference among nine locations;

FIG. 2B shows an example of a conventional speaker's image weighted display in a video conference among four locations;

FIG. 12 is a block diagram of a multi-location conference control unit connected to the multiple-image combiner of FIG. 7;

FIG. 23 shows changes made to the stored pattern in the select memory when changing the image as shown in FIG. 22;

FIG. 29 shows examples of commands used for entering unique data into and reading them from the multi-location control unit;

DESCRIPTION OF THE PREFERRED EMBODIMENTS

Figure 5:
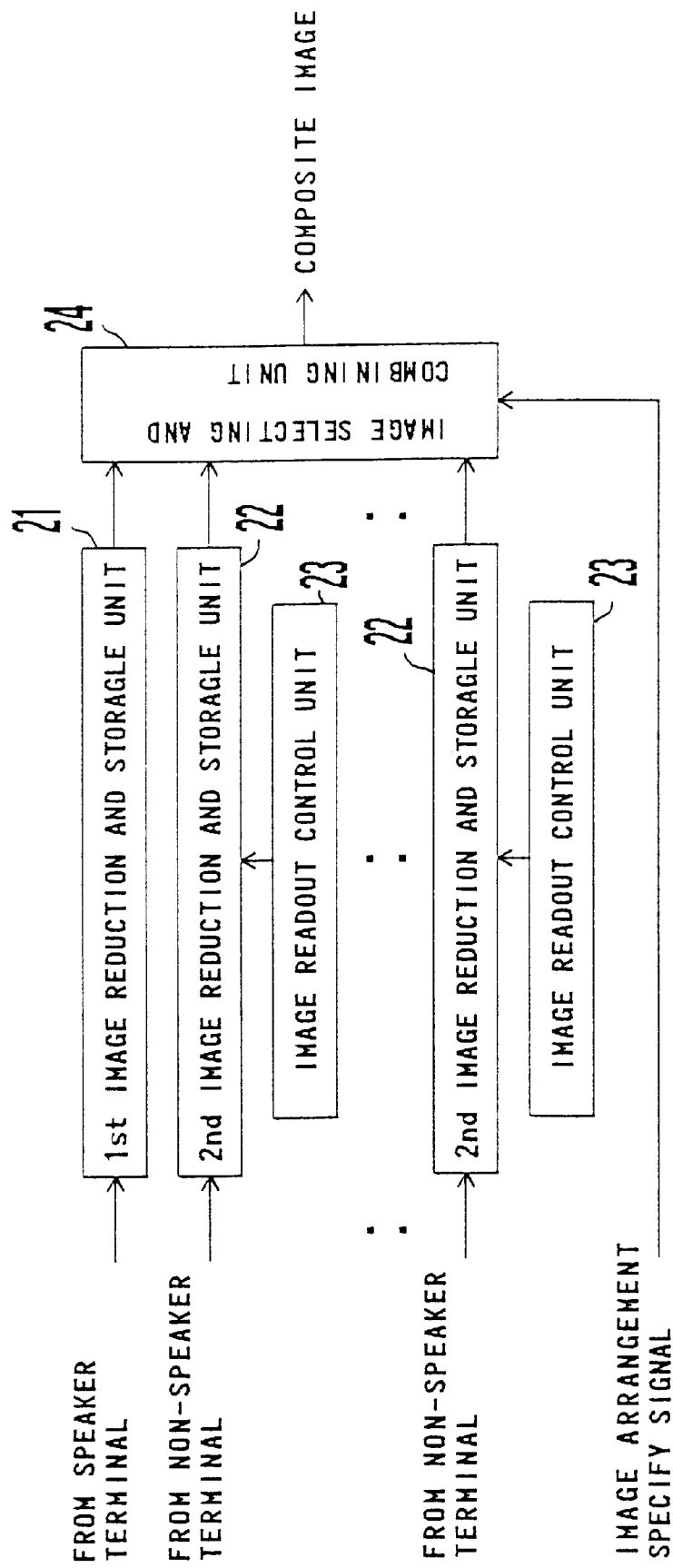
FIG. 5 shows the basic arrangement of a multi-image combiner according to a first embodiment.

FIG. 5 illustrates in block diagram form the basic arrangement of a multi-image combiner according to a first embodiment of the invention. The multi-image combiner is used in a multi-location video conferencing system and arranged to combine image data sent from video conferencing terminals placed at a plurality of locations into a composite or combinational image and send it to each of the terminals.

In FIG. 5, a first image reduction and storage unit 21 reduces the size of an image of the current speaker, that is, an image sent from a terminal on the speaker side, to, for example, 75% (area reduction ratio) of the original image size and stores the reduced image.

Each of second image reduction and storage units 22, which are each provided for a respective one of the terminals, reduces the size of an image from the corresponding terminal which is currently a terminal on the non-speaker side to, for example, 25% of the original image size and stores the reduced image.

Image readout control unit 23, each of which is provided for a respective one of the second image reduction and storage units, control the reading of the reduced images from the second image reduction and storage units in such a form as to allow multiple reduced images to be displayed simultaneously on one display screen.

An image selection and combination unit 24 is responsive to a signal for specifying how images are to be combined from a terminal that is to receive a composite image, i.e., an instruction to combine images in an arrangement that the user at that terminal desires, to select an output of the first image reduction and storage unit 21 and an output or outputs of one or more second image reduction and storage units 22 pixel by pixel, and combine the selected images in such a way that the speaker's image output from the first image reduction and storage unit 21 will occupy, for example, 75% of the area of the composite image, and other non-speakers' images will be arranged as specified by the instruction signal. The resulting composite image is then output to a composite image receiving terminal.

In the first embodiment of the invention which will be described later, for example, the size of the speaker's image reduced by the first image reduction and storage unit 21 is set to 75% of that of the original image sent from a terminal. By way of example, this image is placed in the upper left portion of a composite image produced by the image selecting and combining unit 24. At the right and the lower portion of the composite image, non-speakers' images reduced by the second image reduction and storage units 22 are placed as specified by the image arrangement specify signal.

To arrange images as specified, each of the second image reduction and storage units 22 reduces a non-speaker's image sent from the corresponding terminal to 25% of the original size and provides a plurality of reduced images. The image selecting and combining unit 24 selects, for example, only one out of the multiple reduced non-speaker's images from each of the units 22 according to the image arrangement specify signal and then creates a composite image.

The image arrangement specify signal is fed from a composite image receiving terminal to the controller of the multi-image combiner via a multi-location video conferencing control unit (MCU). The controller stores in a memory in the image selecting and combining unit 24 control data as to which output of the first and second image reduction and storage units 21 and 22 is to be selected for each pixel. The image selecting and combining unit 24 is responsive to the control data to switch its internal selector to select the outputs of the units 21 and 22 and create a composite image.

As with the first embodiment, a second embodiment of the invention, to be described later, is directed to a multi-image combiner for use in a multi-location video conferencing system. The second embodiment is identical in basic arrangement to the first embodiment shown in FIG. 5, except that the first image reduction and storage unit 21 is not provided.

That is, in the second embodiment, the speaker's image, i.e., an image from a terminal on the speaker side, is used in a composite image as it is without reduction. However, to display non-speakers' images in the composite image as well, a portion of the speaker's image is not used and the non-speakers' images reduced by the second image reduction and storage units 22 are inserted into the unused portion of the speaker's image by the image selecting and combining unit 24 as specified by an image arrangement specify signal. The resulting composite image is fed to composite image receiving terminal.

Assuming that a non-speaker's image produced by each of the second image reduction and storage units 22 corresponds to 25% of its original size, 75% of the speaker's image is arranged in the upper left portion of the composite image and the non-speakers' images reduced by the second image reduction and storage units 22 are arranged in the remaining portion of the composite image as specified by the image arrangement specify signal as in the first embodiment. The resulting composite signal is sent to the terminals.

Figure 6:
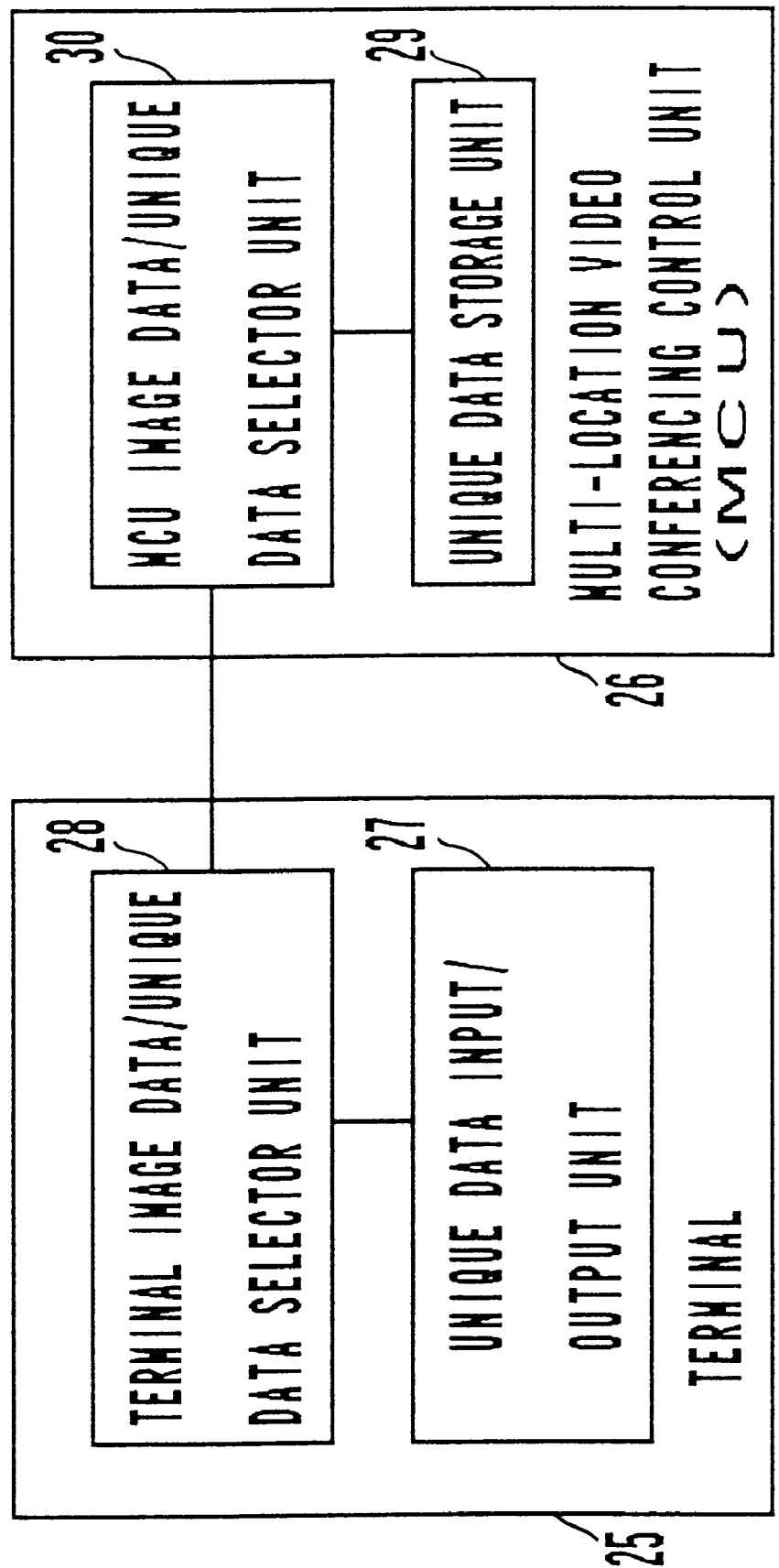
FIG. 6 is a block diagram of a multi-location video conferencing system according to a third embodiment.

FIG. 6 shows a basic arrangement of a third embodiment of the invention, which is directed to a multi-location video conferencing system which does not combine image data sent from terminals at a number of locations and is equipped with a multi-location video conferencing control unit (MCU) for appropriately switching or distributing the image data.

In the third embodiment, as described previously, only image data sent from a sending terminal is distributed to the other terminals. Thus, the line utilization can be increased by transferring unique data other than image data from other terminals between the terminals and the multi-location video conferencing control unit (MCU) using the image data transmission band.

In FIG. 6, a unique data input/output unit 27 in a terminal 25 receives unique data other than video conference image data to be sent to the multi-location video conferencing control unit (MCU) 26 from a user at the terminal, or outputs unique data other than video conference image data sent from the MCU 26 to the user. A terminal image data/unique data selector unit 28 selects and transfers either of video conference image data or unique data provided from the unique data input/output unit 27 to the MCU 26 using the transmission band for video conference image data.

In the MCU 26, a unique data storage unit 29 stores unique data sent from the terminal and an MCU image data/unique data selector unit 30 selects and transfers either of video conference image data or unique data input to or output from the unique data storage unit 29 to the terminal image data/unique data selector unit 28.

In a third embodiment to be described later, in place of terminal image data which is discarded in the MCU 26, floppy disk data or still image data other than video conference image data is sent from the terminal 25 to the MCU 26 as unique data using the transmission band adapted to transfer image data, and then stored in the unique data storage unit 29. The stored data is sent to another terminal as requested by the user at that terminal utilizing the video conference image data transmission band.

Figure 7:
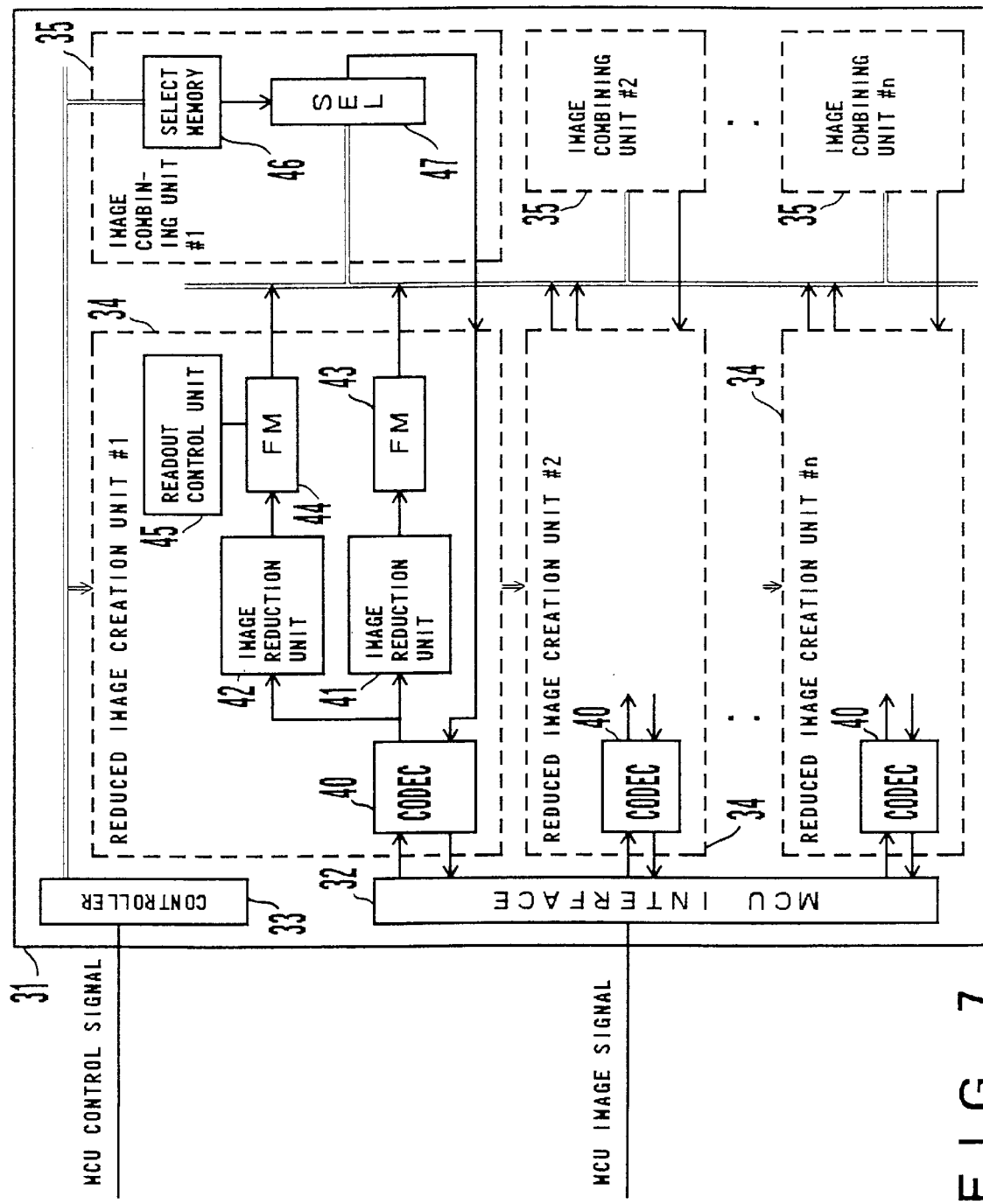
FIG. 7 is a block diagram of the multi-image combiner according to the first embodiment.

FIG. 7 is a block diagram of a multi-image combining unit in a multi-location video conferencing system according to a first embodiment of the invention. The multi-image combining unit 31 is linked to a multi-location video conferencing control unit (MCU) as in the first embodiment. The unit 31 is constructed from an MCU interface 32, a controller 33 which controls the whole unit, n reduced image creation units 34 corresponding to n terminals, and n image combining units 35.

Figure 1:
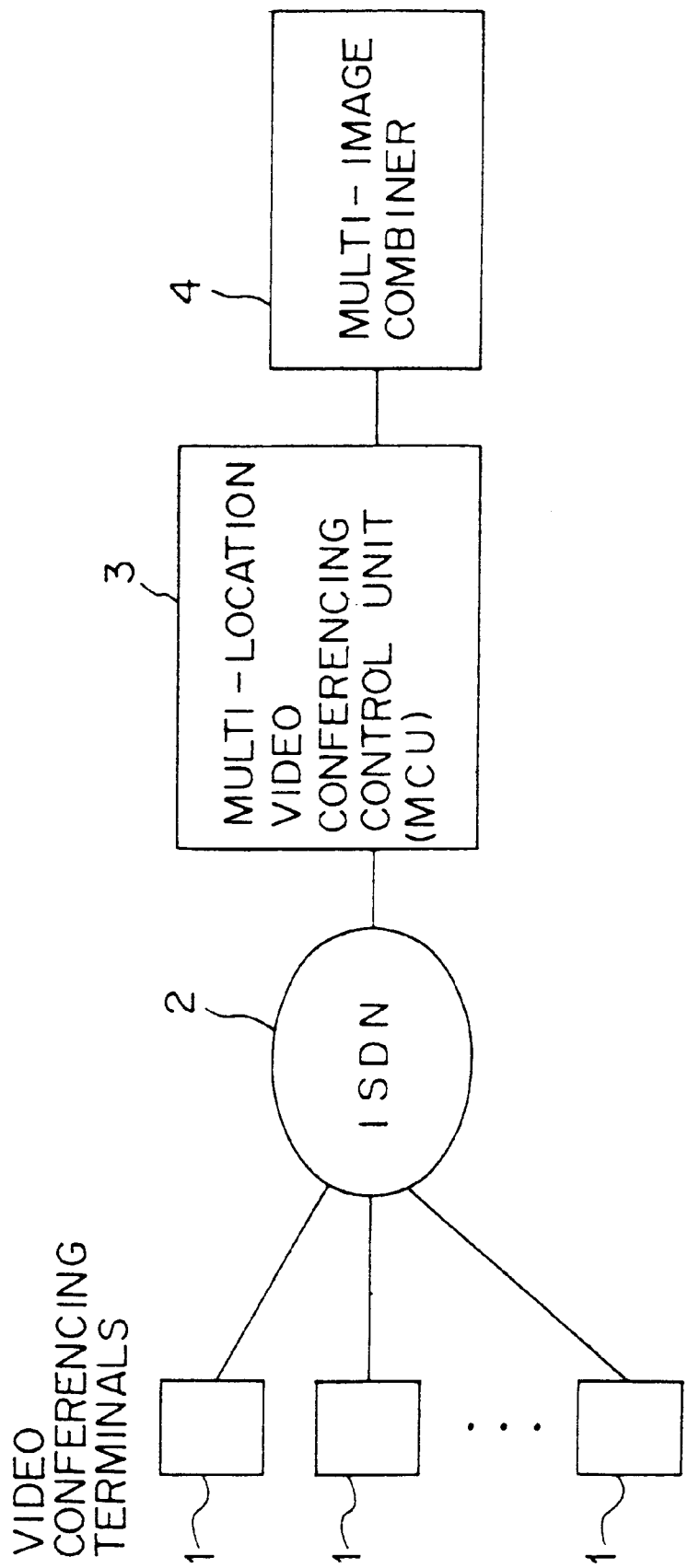
FIG. 1 is a block diagram of a conventional multi-location video conferencing system.
Figure 3:
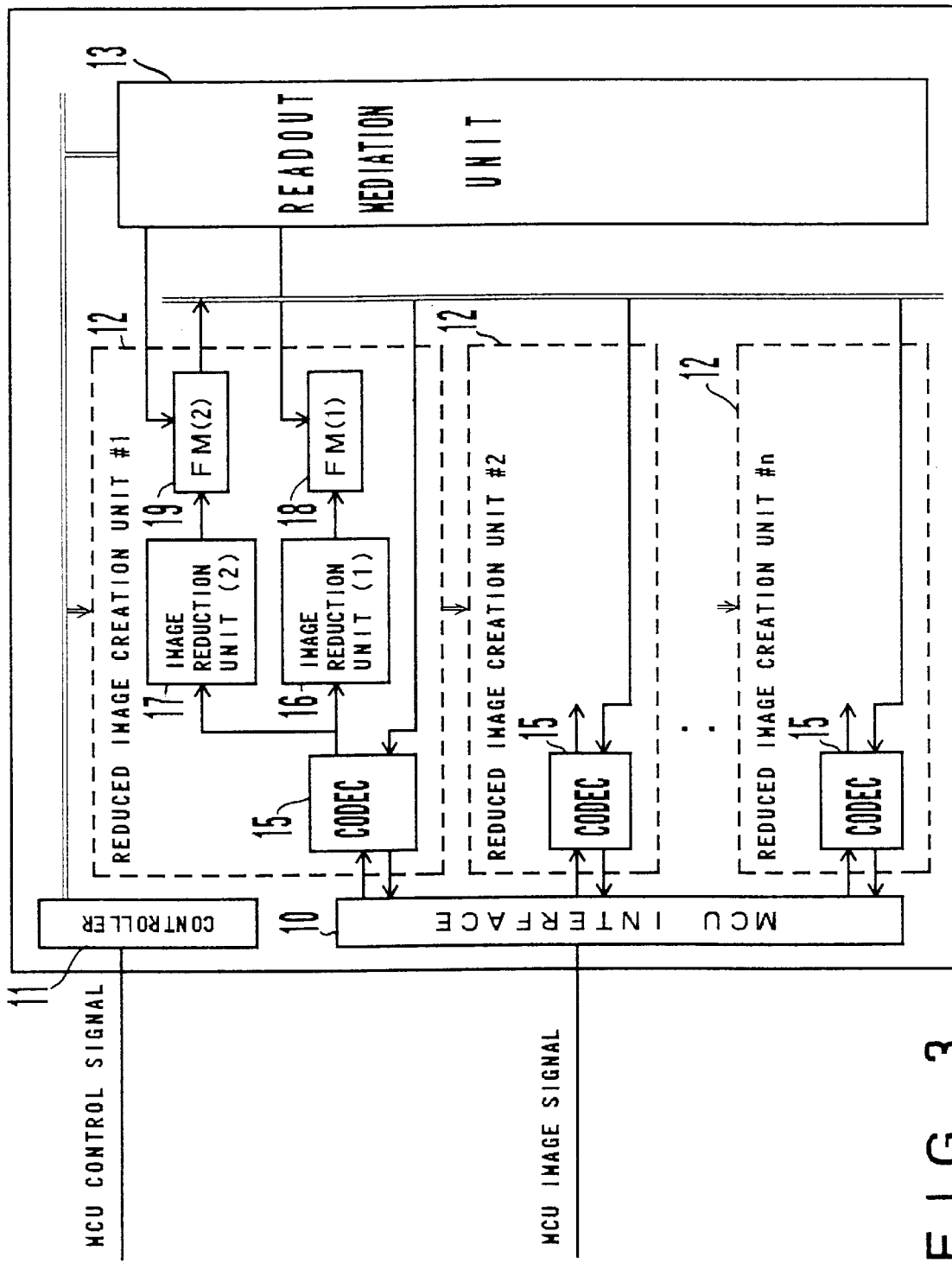
FIG. 3 is a block diagram of the multi-image combiner in FIG. 1.
Figure 4:
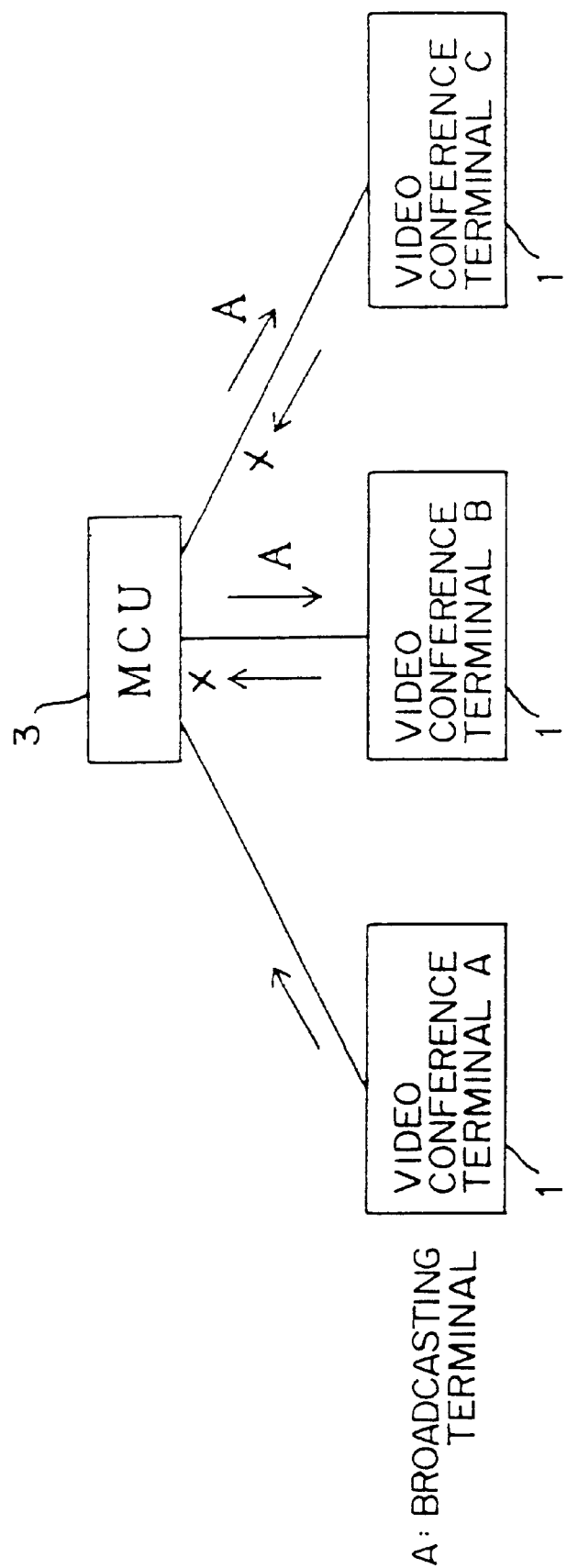
FIG. 4 is a block diagram of a conventional multi-location video conferencing system in which images from a number of locations are not combined.

Each of the reduced image creation units 34 is equipped with a CODEC 40, two image reduction units 41 and 42, two frame memories (FM) 43 and 44, which are all included in the conventional unit of FIG. 3, and a readout control unit 45 for the frame memory 44, which is an addition to the conventional unit. The readout control unit 45 performs readout control on the frame memory 44 which stores a non-speaker's reduced image which is one quarter (25%) of the size of the original image, by way of example, in such a way that a plurality of such reduced images can be displayed simultaneously on one display screen. The CODEC 40 uses the international standard video encoding technique defined in Recommendation H.261 of the ITU-T.

Each of the image combination units 35 is equipped with a select memory 46 and a selector 47. The select memory 46 stores data, under the control of a controller 33, that specifies pixel by pixel of a composite image which of 2n frame memories, two for each of the n reduced image creation units, are to be selected in creating the composite image. The selector 47 makes selections among outputs of the 2n frame memories in accordance with the contents of the select memory 46.

In FIG. 7, the controller 33 communicates with the MCU for control information and the MCU interface 32 communicates with the MCU for image data encoded by the international standard video encoding technique (H.261).

Encoded image data sent from a terminal to the MCU interface 32 is applied to the CODEC 40 in the reduced image creation unit 34 corresponding to that terminal, where it is decoded to video signal data. The video signal data is then applied to the two reduction units 41 and 42. As in FIG. 3, the reduction unit 41 creates a reduced image when the corresponding terminal is the terminal at the location of the current speaker. Here, the reduced image is three quarters (75%) of the size of the original image sent from the terminal and is stored in the frame memory 43. On the other hand, the reduction unit 42 creates a reduced image when the corresponding terminal is a terminal on the non-speaker side. The reduced image at this point is one quarter (25%) of the size of the original image sent from the terminal and is stored in the frame memory 44.

The outputs of the frame memories 43 and 44 in each of the reduced image creation units 34 are coupled to the selector 47 in each of the image combining units 35. Data as to which outputs of frame memories are to be selected to create a composite image are stored in the select memory 46 and the selector 47 is responsive to the data to make selections among the outputs of the 2n frame memories. The switching control of the selector is performed automatically by the selector 47 itself which is continuously supplied with the contents of the select memory 46. The selector 47 has a simple structure to select a specified input from among multiple inputs and can be implemented with an existing integrated circuit such as a one-out-of-eight selector.

As described previously, the frame memory 44 stores image data reduced to 25% of the original image size, which is read by the readout controller 45 in such a way that multiple reduced images can be displayed on one screen. The select memory 46 is set to select one out of the multiple reduced images, and a non-speaker's reduced image selected is placed in that position in a composite image which is determined by the select data in the select memory.

The control unit 33 is supplied from the MCU with MCU control signals which include an image arrangement specify signal by which each terminal specifies which of the participants in the conference are to be selected and how they are arranged in a composite image. In response to the specify signal, the control unit 33 sets the contents of the select memory 46 in each of the image combination units 35. The memory contents can be set separately for each of the image combination units 35. That is, the memory contents are set depending on what composite image the participant at the corresponding terminal wants to watch. The selector 47 produces a composite image in accordance with the memory contents, which, in turn, is converted to coded data (H.261) by the CODEC 40 and then sent to the corresponding terminal via the MCU interface 32 and the MCU.

Figure 8:
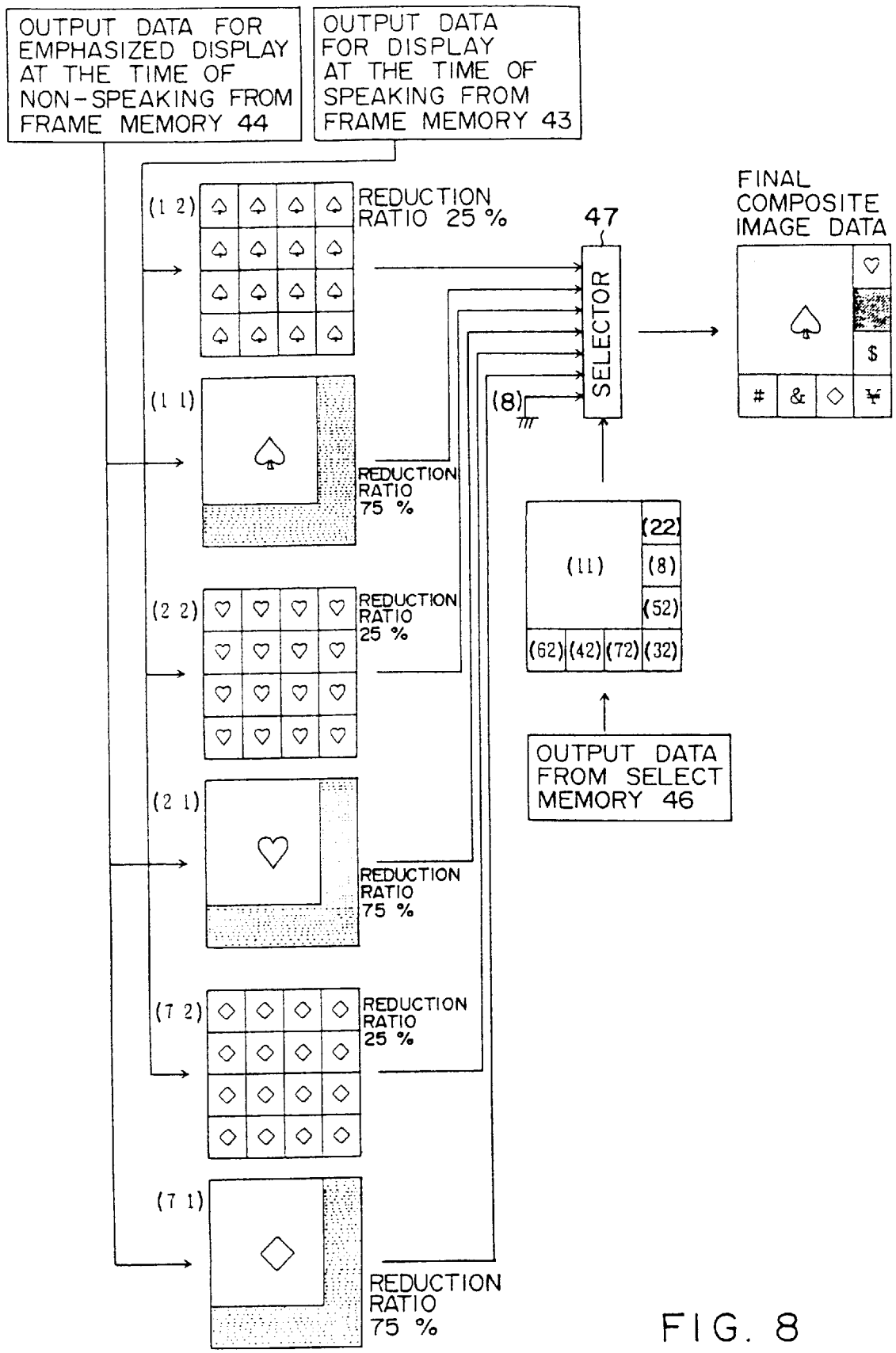
FIG. 8 is a diagram for explaining an image combining process by the multi-image combiner of FIG. 7.

FIG. 8 is a diagram for explaining an example of a composite image produced in the multi-image combiner of FIG. 7. In this example, suppose that there are seven terminals, the image from the speaker terminal is reduced to 75% in size and placed in the upper left portion of a composite image and images from non-speaker terminals are reduced to 25% in size and displayed in the other portions of the composite image.

As described in conjunction with FIG. 7, image data from each terminal is applied to the reduction units 41 and 42 regardless of whether the participant at that terminal is speaking or not. Image data from the reduction unit 41 having a reduction ratio of 75% is stored in the frame memory 43, and image data from the reduction unit 42 having a reduction ratio of 25% is stored in the frame memory 44.

In FIG. 8, image data at the time of speaking from a terminal corresponding to an image of a spade is output from the frame memory 43 as (11), and image data at the time of non-speaking is output from the frame memory 44 as (12). In reading from the frame memory 44, data readout is controlled by the readout controller 45 as described previously such that multiple images reduced to 25% in size, 16 images in this example, can be displayed on a display screen.

Likewise, image data from a terminal corresponding to an image of a heart at the time of speaking is output from the frame memory 43 as (21), and image data at the time of non-speaking is output from the frame memory 44 as (22). In this manner, for seven terminals, image data at the time of speaking and image data at the time of non-speaking are output to the selector 47. The selector is further supplied with ground potential (8) which, when a participant at a terminal is speaking and hence his or her image is being displayed in the upper left portion of a composite image, blacks out that area in the composite image where that image is to be displayed after that participant stops speaking.

The selector 47 selects one out of its inputs in accordance with each piece of data placed in the select memory 46 for a respective one of pixels forming a composite image and makes selections for all the pixels to thereby create the composite image. In this example, to place an image of a spade in the upper left portion of the composite image as the image of the speaker, select data (11) is placed in the corresponding area of the select memory. Further, select data (22) is placed in the corresponding area of the select memory to place an image of a heart in the uppermost right portion of the composite image as a non-speaker's image. Select data (8) is placed in the corresponding area of the select memory adjacent to the data (22) to select the ground potential for blacking out the corresponding area under the image of the heart.

In FIG. 7, by each select memory 46 storing select data as to which input the corresponding selector 47 is to select pixel by pixel, each of the n image combining units 35 is allowed to produce a different composite image and send it to the corresponding terminal. Thus, each individual participant in the conference can specify only the participants he or she wants to see, and optionally specify the arrangement of their images in the composite image.

Figure 9:
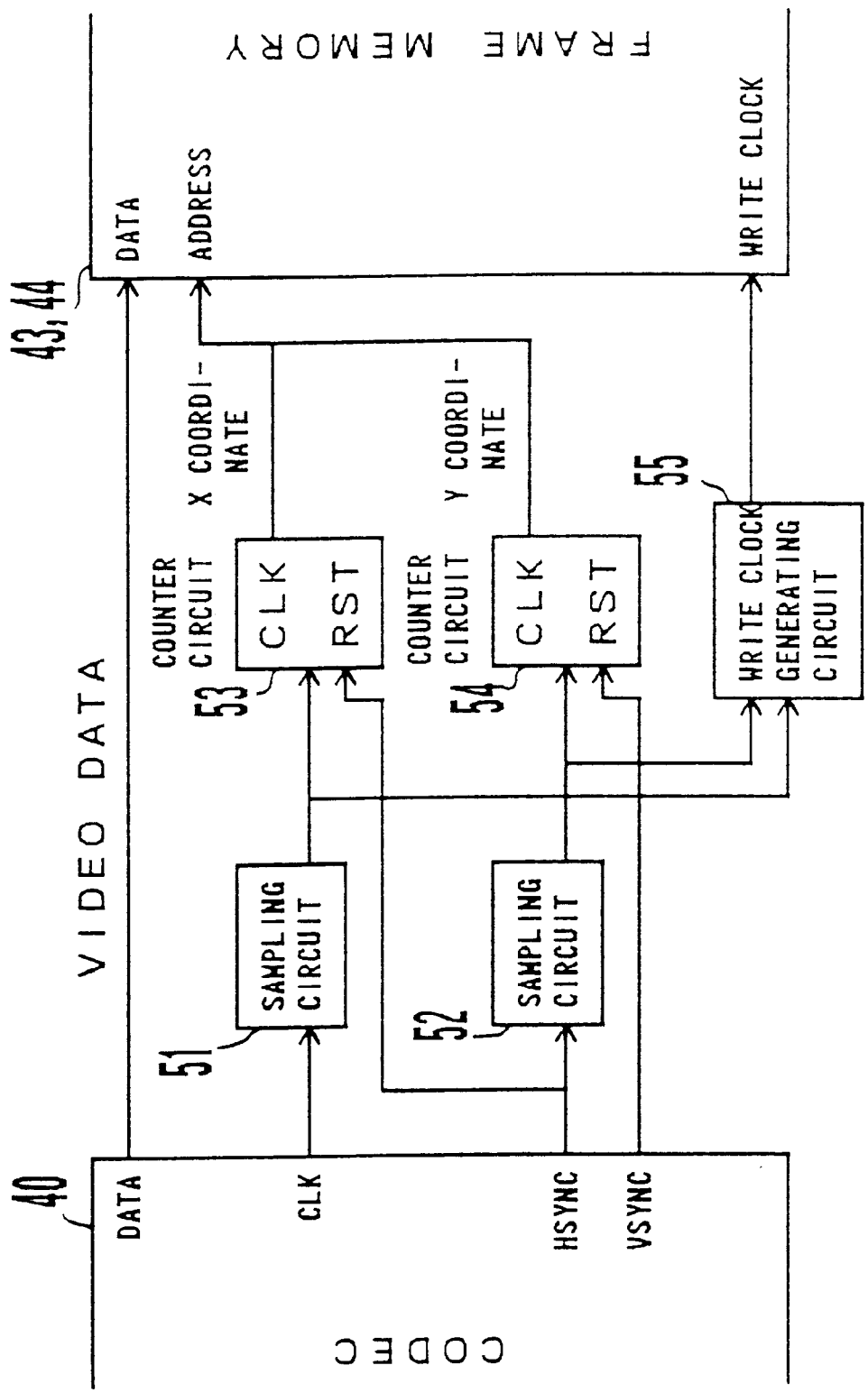
FIG. 9 is a block diagram of the reduction section in the reduced image creation unit of FIG. 7.

FIG. 9 is a block diagram of the reduction units 41 and 42 in FIG. 7. The reduction units 41 and 42 are identical in arrangement except for the reduction ratio. Video signal data from the CODEC 40 is applied to the frame memory 43 or 44 as it is, but write addresses in the memory are specified by the corresponding reduction unit.

The reduction unit comprises two pulse sampling circuits 51 and 52, two counter circuits 53 and 54, and a write clock generating circuit 55.

In FIG. 9, the sampling circuit 51 has its input connected to receive a clock signal from the CODEC 40 and its output connected to the clock input terminal of the counter circuit 53, the output of which provides the X coordinate of a write address in the frame memory. Assuming that the sampling circuit 51 has a sampling ratio of ½ by way of example, the range of the X coordinates produced by the counter 53 will be ½ of the range of the X coordinates for a full screen. As a result, an image will be reduced to ½ in the X direction. The counter circuit 53 has its reset terminal connected to receive a horizontal sync signal from the CODEC 40. Upon receipt of a horizontal sync pulse, the counter circuit 53 is reset and then begins to count clock pulses from 0.

The sampling circuit is arranged to sample clock pulses. In the present embodiment in which a video image is reduced to 25%, three clock pulses are sampled out of every four clock pulses. That is, the sampling circuit 51 performs an operation of removing three clock pulses out of every four clock pulses in the sequence of clock pulses from the CODEC40 which have a one-to-one correspondence with pixels in a video signal from the CODEC40.

On the other hand, the horizontal sync signal is applied to the sampling circuit 52 which has its output connected to the clock terminal of the counter circuit 54, which provides the Y coordinate of a write address to the frame memory. This counter operates identically to the counter circuit 53. The counter circuit 54 has its reset terminal connected to receive a vertical sync signal from the CODEC 40. Upon receipt of a vertical sync pulse, the counter circuit 54 is reset and then begins to count the clock pulses from 0. In response to the outputs of the sampling circuits 51 and 52, the write clock generating circuit 55 provides write clock pulses to the frame memory.

Figure 10:
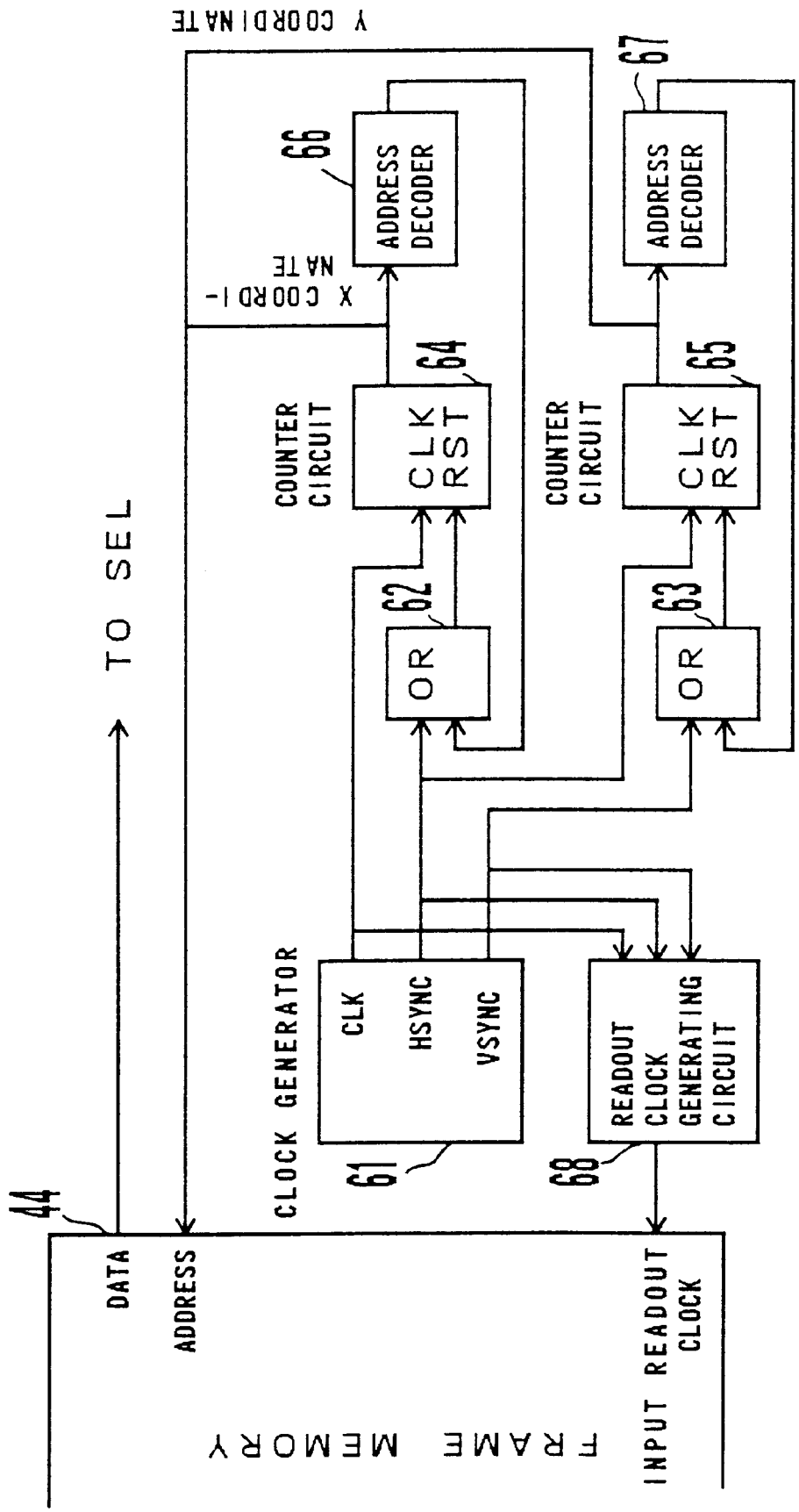
FIG. 10 is a block diagram of the readout controller in the reduced image creation unit of FIG. 7.

FIG. 10 is a block diagram of the readout control unit 45 of FIG. 7. The readout controller is arranged to read reduced image data which is stored reduced to 25% in the frame memory 44 in such a way that multiple reduced images can be displayed on one screen. As shown, the readout control unit 45 is constructed from a clock generator 61, two OR circuits 62 and 63, two counter circuits 64 and 65, two address decoders 66 and 67, and a readout clock generator 68.

The clock generator 61, which is a standard one, provides a clock signal to the counter circuit 64 and the readout clock generator 68. The counter circuit 64 counts clock pulses applied to its clock terminal and provides its count value to the address decoder 66 and to the frame memory 44 as the X coordinate of a read address in the frame memory 44. The address decoder 66 provides a signal at a high level to the OR circuit 62 when the address reaches 160. This signal is applied via the OR circuit 62 to the reset terminal of the counter circuit 64, so that it is reset.

For example, assume that the X coordinate for one full-size image is set in the range of 1 to 640 and an image reduced to ¼ is stored in an area of the frame memory 44 corresponding to the X coordinate range of 1 to 160. Then, the counter circuit 64 will repeatedly output the X coordinates in the range of 1 to 160 each time it is reset, thereby outputting X coordinates a number of times to the reduced image. The counter circuit 64 is also reset by each horizontal sync pulse from the clock generator 61.

The OR circuit 63, the counter 65 and the address decoder 67 provide Y coordinates for the read addresses in the frame memory 44. Their operation is similar to that of the OR circuit 62, the counter circuit 64 and the address decoder 66 which correspond to the X coordinates. For example, assume that the Y coordinate for one full-size image ranges from 1 to 480 and the address decoder 67 provides a signal at a high level to the OR circuit 63 when the address reaches 120. Then, the Y coordinates in the read addresses for data stored reduced to ¼ in the frame memory 44 will be output four times until a vertical sync pulse is applied from the clock generator 61 to the OR circuit 63. The read clock generator 68 is responsive to the clock signal, the horizontal sync signal and the vertical sync signal from the clock generator 61 to provide read clock pulses to the frame memory 44 for one image.

Figure 11:
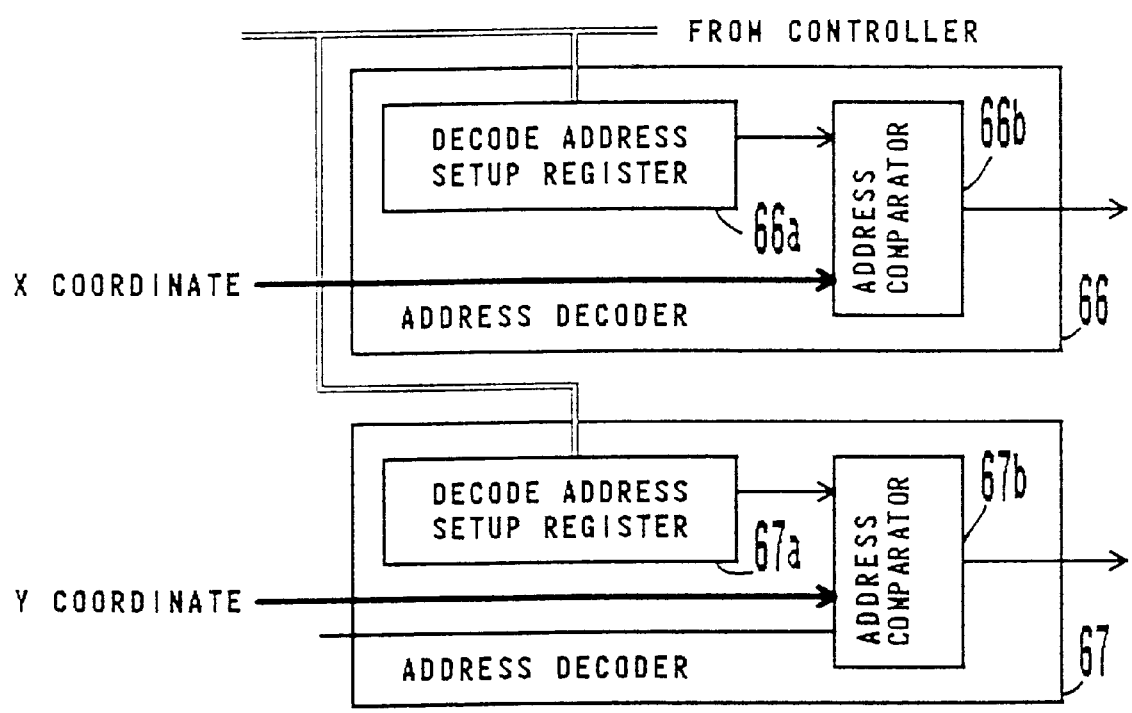
FIG. 11 is a block diagram of the address decoders of FIG. 10.

FIG. 11 illustrates in block diagram form an arrangement of each of the address decoders 66 and 67 in the readout controller of FIG. 10. The address decoders 66 and 67 are intended to reset the display addresses in the X and Y directions at regular intervals in order to successively output reduced video image data stored in the frame memory 44.

The address values for resetting depend on the reduction ratio of a reduced image stored in the frame memory 44. Thus, these addresses to be decoded are set up by the control unit 33 in the multi-image combiner. That is, the control unit 33 places decode addresses in the X and Y directions into decode address setup registers 66a and 67a in the address decoders 66 and 67, respectively, according to the reduction ratio of a reduced image in the frame memory. Address comparators 66b and 67b compare the X and Y coordinate values from the counters 64 and 65 with the addresses in the decode address setup registers 66a and 67a, respectively. When the address comparison indicates equality, each of the address comparators 66b and 67b issues a reset signal to a corresponding one of the counter circuits 64 and 65 via the corresponding OR circuit.

Next, the description will be given of a method of inputting an image arrangement specify signal from a terminal to the multi-image combiner and a method of detecting a speaker from among participants in the conference, including an arrangement of the multi-location conference control unit (MCU). FIG. 12 is a block diagram of the MCU. The MCU is constructed from a main controller 71, a line controller 72 for controlling communications over lines between the MCU and the terminals, a line interface 73, an H.221 demultiplexer/multiplexer 74 for demultiplexing/multiplexing frame data in the H.221 format, a video processor 75 for processing video signals, a speaker detector 76 for detecting the speaker among the participants in the conference on the basis of the level of a voice signal, and a data demultiplexer/multiplexer 77 for multiplexing/demultiplexing low speed data (LSD) used in data communications in the video conferencing system.

An image arrangement specify signal from a terminal, which specifies an arrangement of participants' images in a composite image, is transferred using LSD (low speed data) in an H.221 frame, and is applied to the data demultiplexer/multiplexer 77 via the line interface 73 and the H.221 demultiplexer/multiplexer 74. The demultiplexed specification signal is then applied via the main controller 71 to the controller 33 in the multi-image combiner as an MCU control signal. The speaker detector 76 checks the level of voice signals from each of the terminals in the conference and recognizes the terminal at which the voice level is greatest as the current speaker terminal. The result is presented to the controller 33 as an MCU control signal. In order to prevent a change of speakers in too short a time, the voice level is measured for a fixed period of time and the change of speakers is recognized only when the voice level of another participant is higher than that of the current speaker after that fixed period of time has elapsed.

Figure 13:
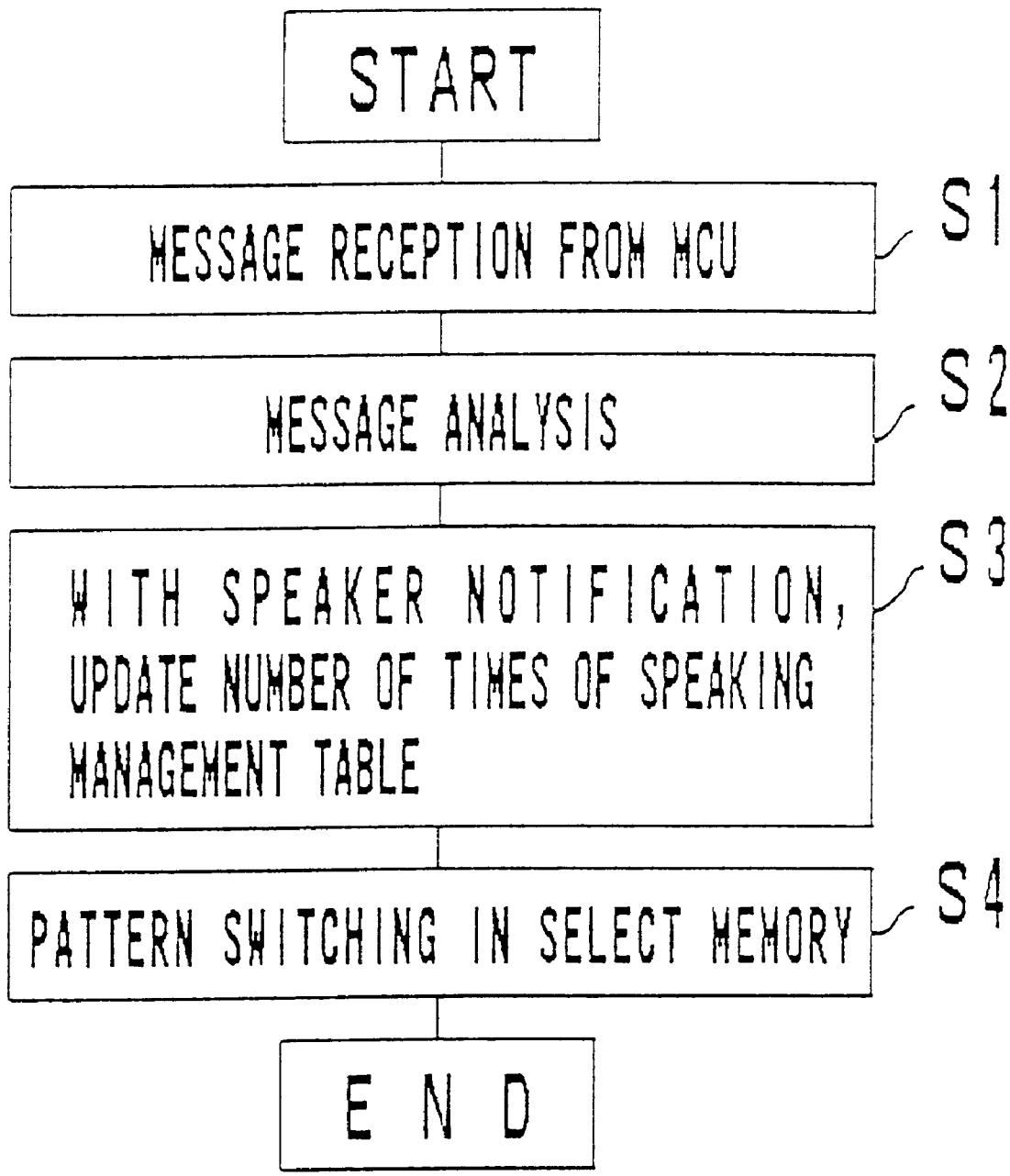
FIG. 13 is a basic control flowchart for the operation of the controller in the multi-image combiner of FIG. 7.

FIG. 13 is an operating flowchart for the basic control operation of the controller 33 in the multi-image combiner. A communication message issued by a terminal of the current speaker is received from the MCU in step S1 and then sent to a message analyzer (not shown) for analysis in step S2. When it turns out that the message identifies the speaker, the number of times of speaking by the participant at that terminal is incremented by one in step S3. The number of times of speaking is stored in a number of times of speaking management table (not shown) which manages the number of times of speaking for each participant in the conference. At the time of a change of speaker, the pattern in the select memory in the image combining unit 35 of FIG. 7 is switched to another pattern in step 4 and then the procedure comes to an end.

Figure 14:
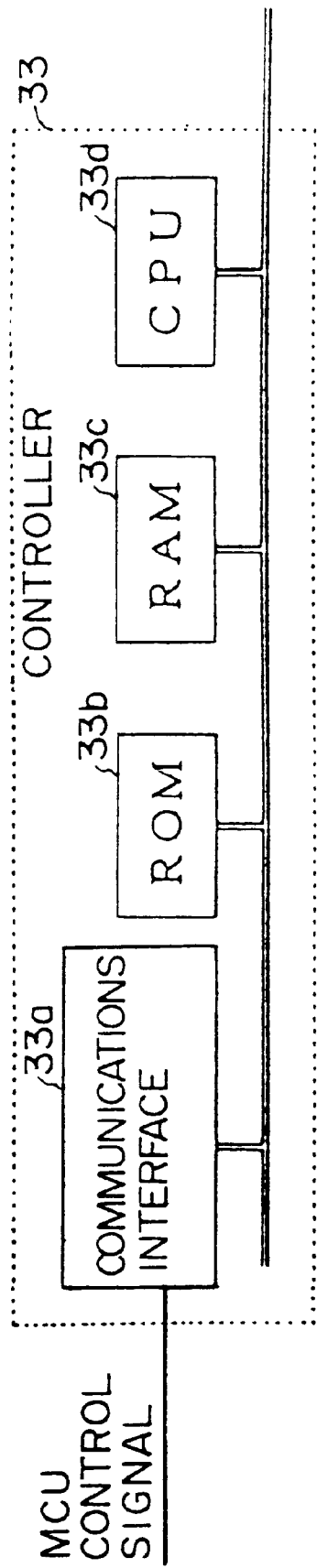
FIG. 14 is a block diagram of the controller in the multi-image combiner of FIG. 7.
Figure 15:
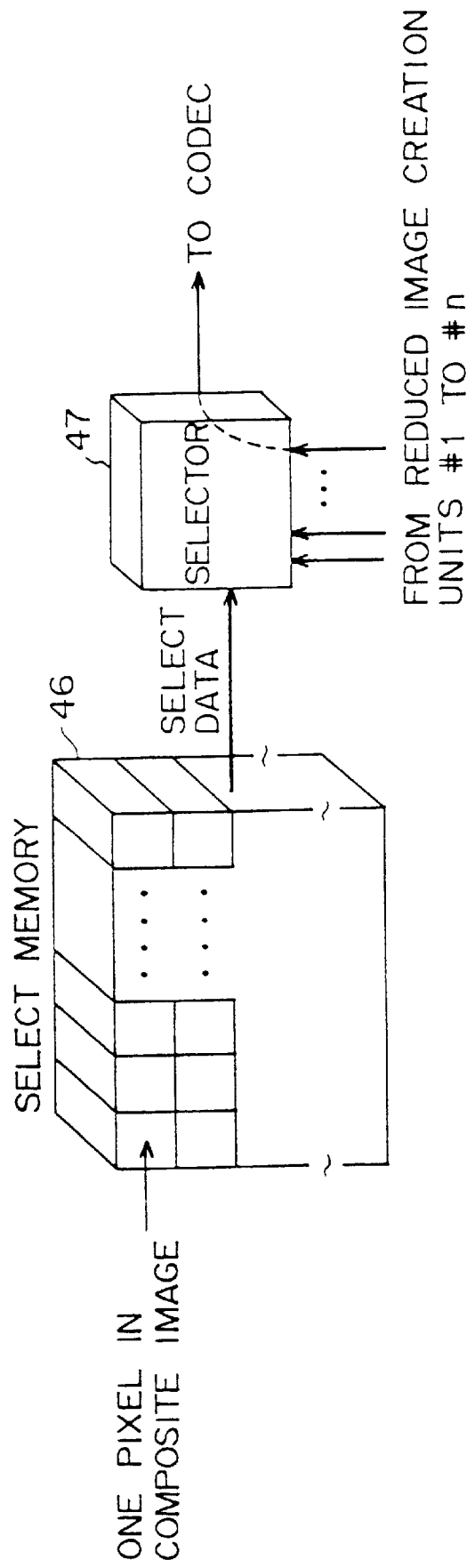
FIG. 15 is a diagram for explaining the selection control by the selector of FIG. 7 based on the contents set in the select memory.

Reference will be made to FIGS. 14 and 15 to further describe the operation of the controller 33 in the multi-image combiner in connection with the operating flowchart for the basic control operation of the controller 33 of FIG. 13.

FIG. 14 is a block diagram of the controller 33, which is constructed from a communications interface 33a for communicating with the multi-location video conferencing control unit (MCU), a read-only memory 33b for storing a control program, a random access memory 33c used as a work area, and a CPU 33d for executing the control program. A bus connected to the CPU is connected to the reduced image creation units 34 and the select memories 46. The controller 33 and the MCU are linked through the unique communications interface for transfer of the MCU control signals therebetween.

FIG. 15 is a diagram explaining the control operation of the selector which is responsive to the contents in the select memory 46 set by the controller 33. The select memory 46 is a dual-port random access memory. One port of the select memory 46 is connected to the CPU 33d in the controller 33 to receive control data. The other port of the select memory 46 is connected to the selector 47 to provide the control data thereto. The control data, which is stored in the select memory 46 for each pixel on a screen, determines which of the frame memories in a reduced image creation unit is to be selected for each pixel. The control data is applied to the selector 47.

Upon receipt of a message from the MCU in step S1 of FIG. 13, the controller 33 analyzes it in the CPU 33d in step S2. In the case of a change of speaker, data in the select memory 46 is rewritten in step S4.

Figures 16A, 16B:
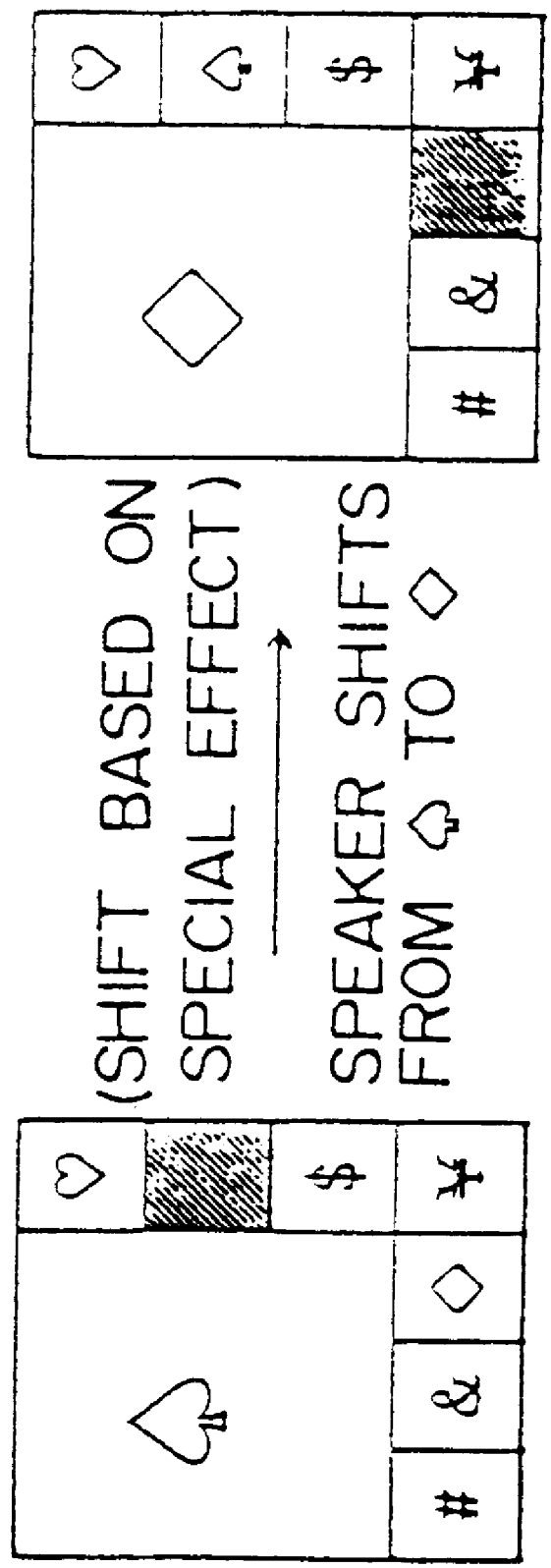
FIG. 16 shows a change in image at the time of change of speaker in the first embodiment.

FIG. 16 shows how a composite image is changed at the time of a change of speaker in the first embodiment. When the speaker changes from the spade to the diamond, the composite image display will change from FIG. 16A to FIG. 16B. In this case, instead of instantly changing the image display, it is also possible to introduce a special effect of gradually changing the image display.

Figure 17:
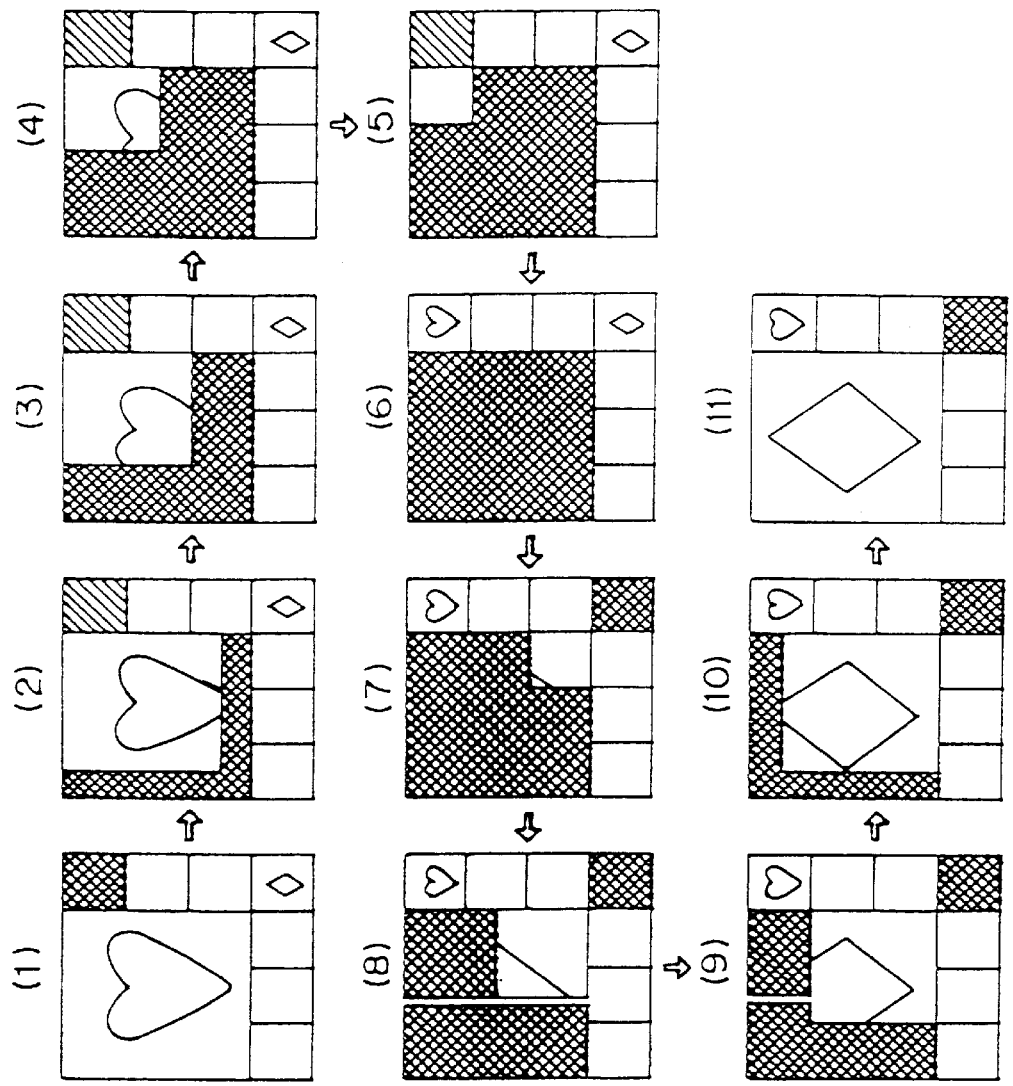
FIG. 17 shows changes made to the stored pattern in the select memory which produce a special effect on the image display.

FIG. 17 shows data switching patterns in the select memory in the image combining unit for producing a special effect of fading in/fading out of a speaker. Unlike FIG. 16, in FIG. 17, image switching is made from the heart to the diamond. By changing the contents of the select memory 46 with time as shown from (1) to (11) in FIG. 17, the change of speaker can be displayed gradually.

Figure 18:
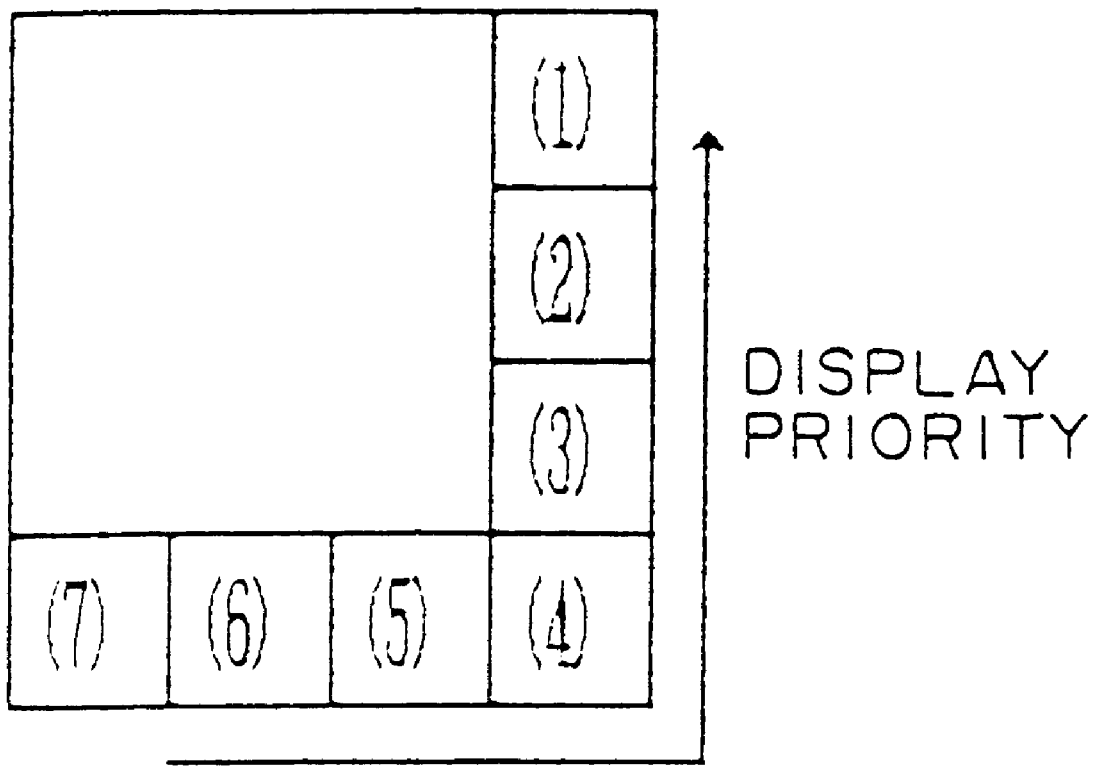
FIG. 18 is a diagram for explaining the assignment of display priorities to images of current non-speakers on the basis of the numbers of times they have been speakers.

In the first embodiment, the non-speakers' images shown in FIG. 8 can be arranged in the order of the numbers of times of speaking. As described previously, the speaker detector 76 of FIG. 12 informs the controller 33 in the multi-image combiner of the speaker detected and the number of times of speaking so far by him or her is stored in the speaking times management table. Thus, the display priorities of non-speakers' images from terminals can be set according to the descending order of the numbers of times of speaking. FIG. 18 shows an example of assignment of display priorities to non-speakers' images. In this figure, (1) shows an image of a current non-speaker who has spoken most often. Other non-speakers' images are displayed in descending order of the numbers of times of speaking as shown at (2), (3), (4), . . . , etc.

Figure 19:
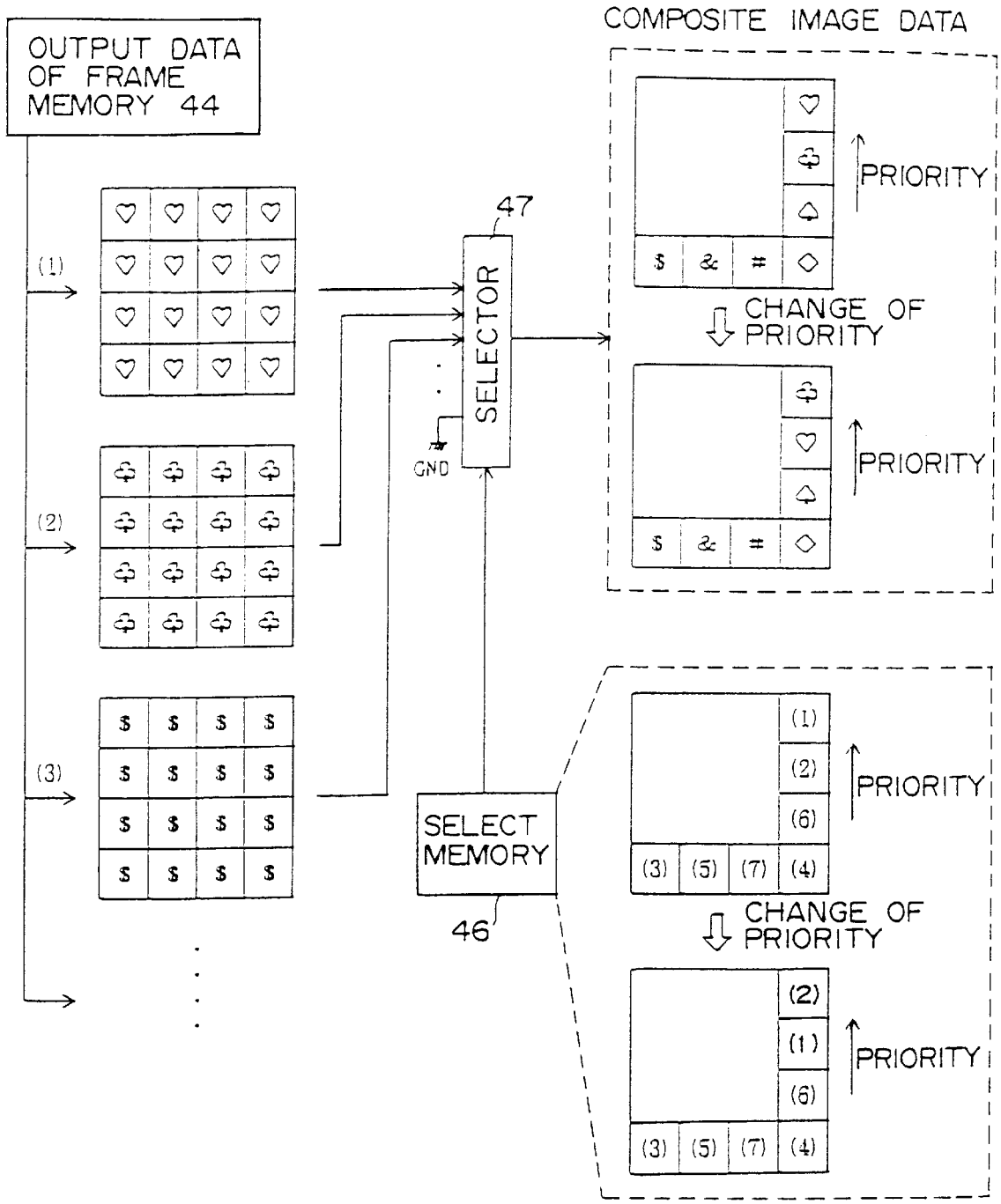
FIG. 19 is a diagram for use in explanation of modification of the display priority in a composite image.

FIG. 19 is a diagram for explaining an example of changing the priorities when the display priority depending on the number of times of speaking is set up on each non-speaker's image. When, of the non-speakers, the number of times of speaking of a participant indicated by a spade becomes higher than that of a participant indicated by a heart, who had the highest number of times of speaking, the contents of the select memory 46 are changed by the controller 33, whereby the display area for the participant indicated by a heart and the display area for the participant indicated by a spade are inter-changed.

Figure 20:
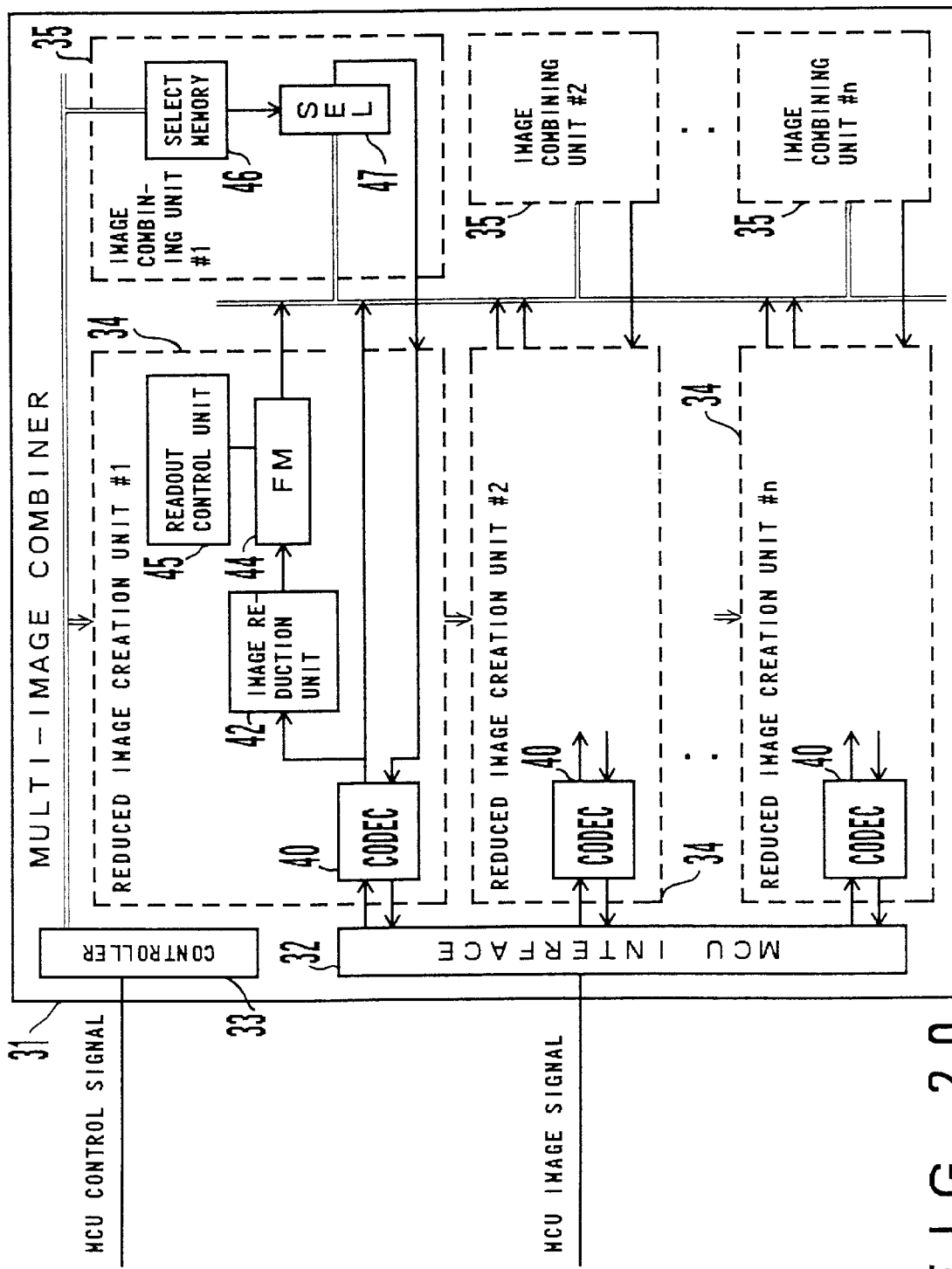
FIG. 20 is a block diagram of a multi-image combiner according to a second embodiment.

FIG. 20 is a block diagram of a multi-image combiner according to a second embodiment, which has a reduced amount of hardware required by comparison with the multi-image combiner of FIG. 7 according to the first embodiment. The image combiner of FIG. 20 is identical in arrangement to the image combiner of FIG. 7, except that each of the reduced image creation units 34 is not provided with the reduction unit 41 for creating a reduced image and the frame memory 44 for storing the reduced image. In FIG. 20, an output of the CODEC 40 is applied to the corresponding selector 47 as well as the image reduction unit 42 and the selector 47 can select either of outputs of the frame memory 44 or the CODEC 40.

That is, in the multi-image combiner according to the second embodiment, an image of the current speaker is used as it is (i.e., an image of full size (100%) without reduction). That portion of the speaker's image which corresponds to the right and lower areas in which non-speakers' images are to be displayed as shown in FIG. 8 is not selected by the selector 47 in each of the image combining unit 35. That is, the corresponding image data is not used in the multi-image combiner and consequently it will be discarded.

Figure 21:
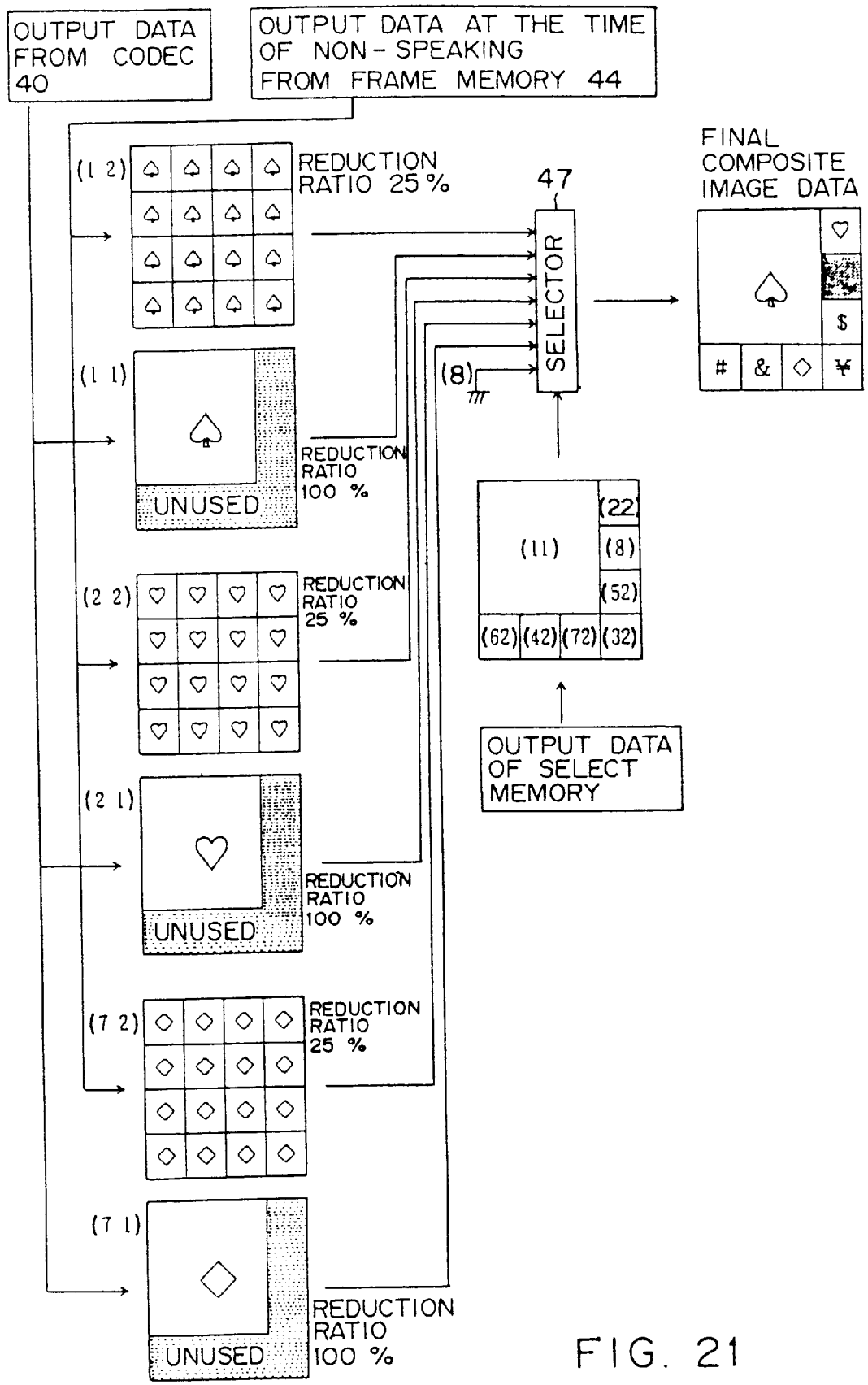
FIG. 21 shows an example of a composite image created by the multi-image combiner of FIG. 20.

FIG. 21 shows an example of combining images in the multi-image combiner of FIG. 20. In comparison with FIG. 8, 25% of the image of the current speaker output from the CODEC 40, which corresponds to the right and lower areas of the image, is not used and instead non-speakers' images are inserted into that portion to thereby create a composite image.

Thus, in the multi-image combiner of the second embodiment, image data for 25% of a speaking time image corresponding to its right and lower areas is not used. Therefore, data for the unused area may be transmitted from a terminal in the form of a fixed color, which will allow the coding efficiency to be increased and the image quality of the used area to be improved. In this case, only the terminal on the speaker side needs to perform such processing as a result of being informed by the MCU that it is on the speaker side. Alternatively, all the terminals may perform such processing; as non-speakers' images are always reduced to 25% in size and hence the right and lower areas of the images being displayed in a fixed color has little effect on the overall image.

Figure 22B:
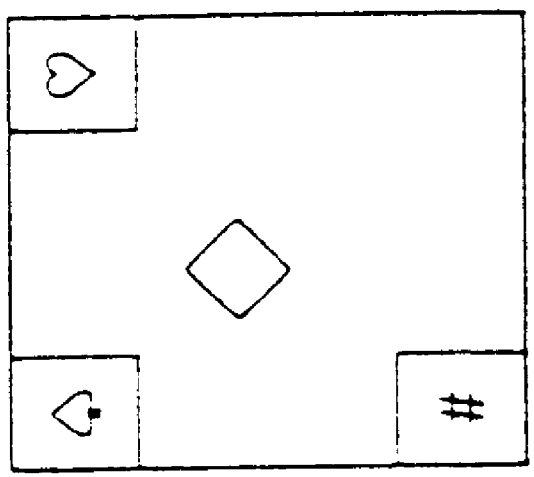
FIG. 22 shows changes made to the image at the time of a change of speaker in the second embodiment.
Figure 22A:
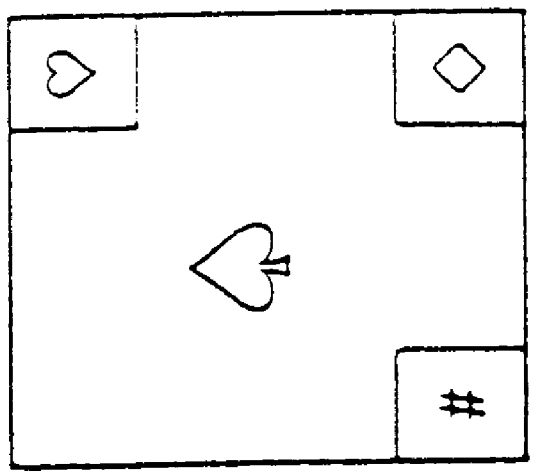

FIG. 22 is a diagram for explaining of an example of the change of images when the speaker changes in the second embodiment. Like FIG. 16, FIG. 22 shows the case where the speaker's image shifts from spade to diamond. However, this case corresponds to a four-location video conference. As shown in FIG. 22A, an area of the display screen which is at the upper left of the composite image, and where the spade is to be displayed reduced at the time of non-speaking, is used as a portion of the display area of the spade at the time of speaking.

FIG. 23 is a diagram for explaining a method of controlling the change of the image display as shown in FIG. 22. In FIG. 22A, data corresponding to an input number from the frame memory storing an image of a spade is stored in that area of the stored pattern in the select memory which corresponds to the speaker's terminal, while, in FIG. 22B, data corresponding to an input number from the frame memory storing an image of a diamond is stored in the same area of the stored pattern in the select memory.

Figure 24:
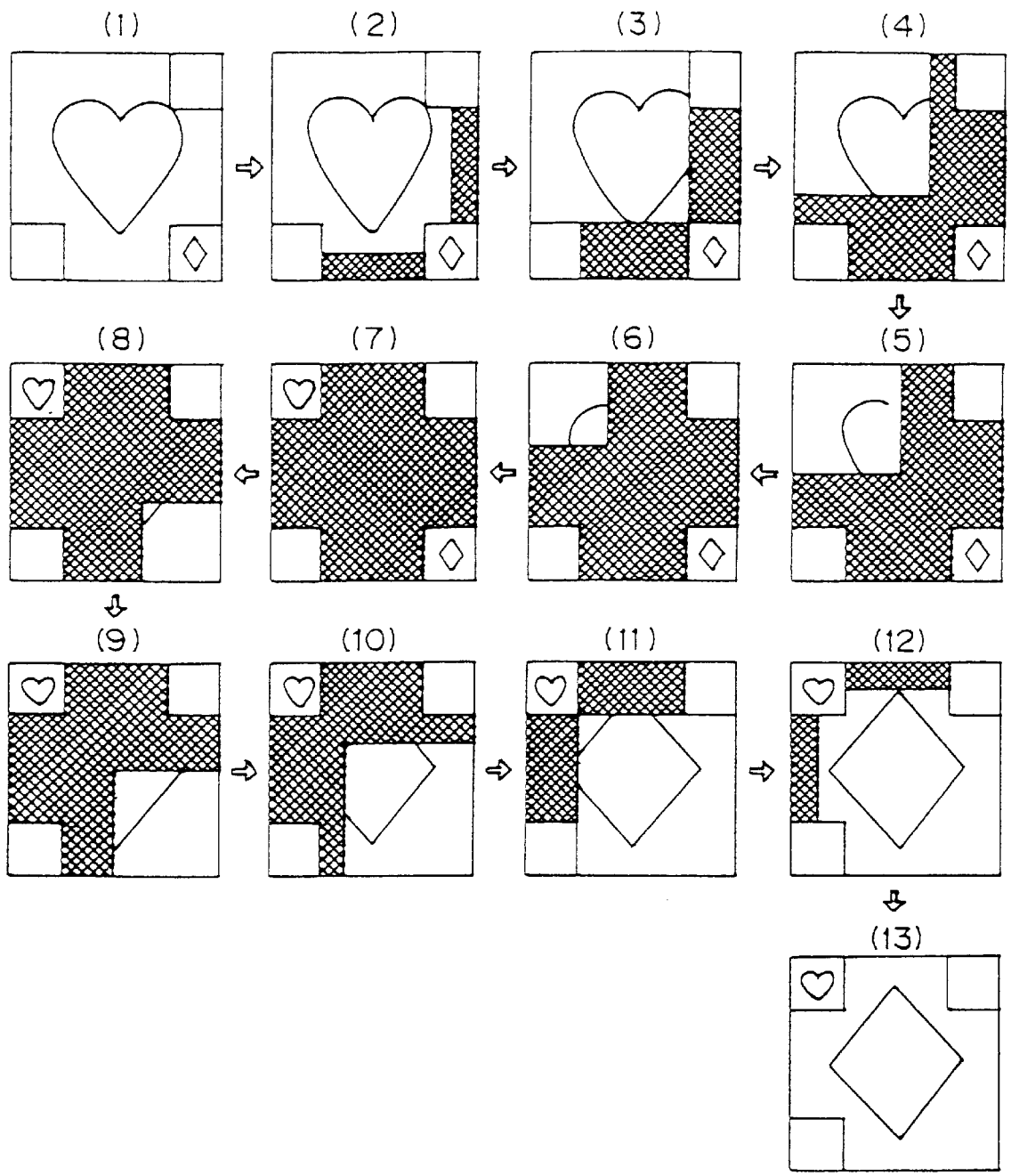
FIG. 24 is a diagram for explaining the pattern switching in the select memory when an image is changed slowly as shown in FIGS. 22 and 23.

FIG. 24 is a diagram for explaining the changes in the stored pattern of the select memory with time which produce a special effect of slowly changing the composite image when the speaker changes as shown in FIG. 22 or FIG. 23. This figure shows the case where the speaker shifts from the heart to the diamond. By switching the stored patterns in the select memory in the order from (1) to (13), it becomes possible for the participants in the conference to watch a smooth change of speakers.

Figure 25:
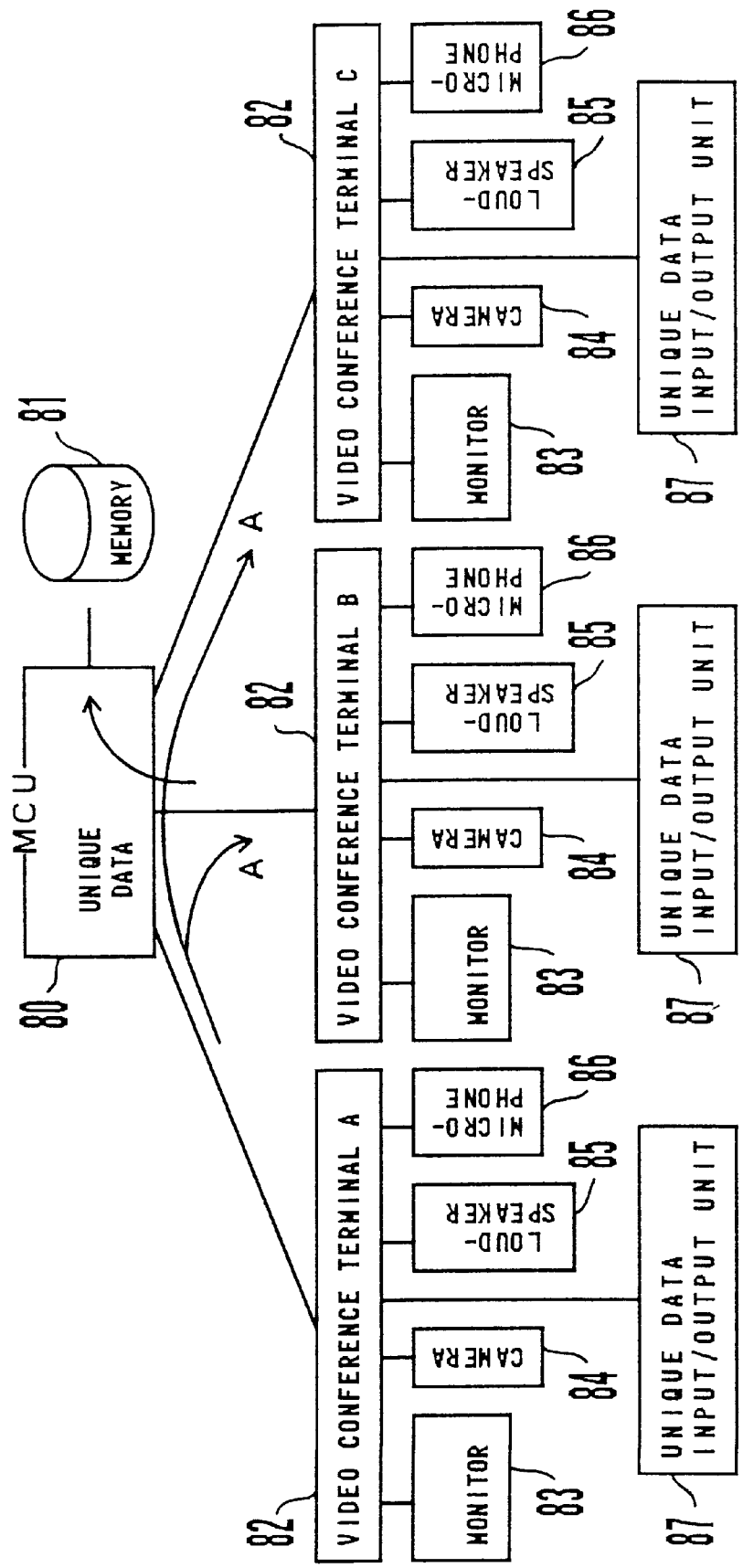
FIG. 25 is a block diagram of a multi-location video conferencing system according to the third embodiment.

Next, a third embodiment of the invention will be described. This embodiment is directed to a multi-location video conferencing system arranged such that the MCU distributes an image from a broadcasting terminal to the other terminals. That is, this embodiment does not create a composite image. FIG. 25 is a block diagram of such a multi-location video conferencing system. In this figure, a multi-location video conferencing control unit (MCU) 80 is equipped with a memory 81 which stores unique data other than conference image data transferred from each terminal using the conference image data transmission band. Each of video conference terminals 82 is equipped with a TV monitor 83, a TV camera 84, a loudspeaker 85, a microphone 86, and a unique data input/output unit 87 for receiving or sending unique data other than conference image data.

In the third embodiment, data from the unique data input/output unit 87 in a video conference terminal 82 is sent to the MCU 80 for storage in the memory 81 and then sent to the other terminals when necessary.

Figure 26:
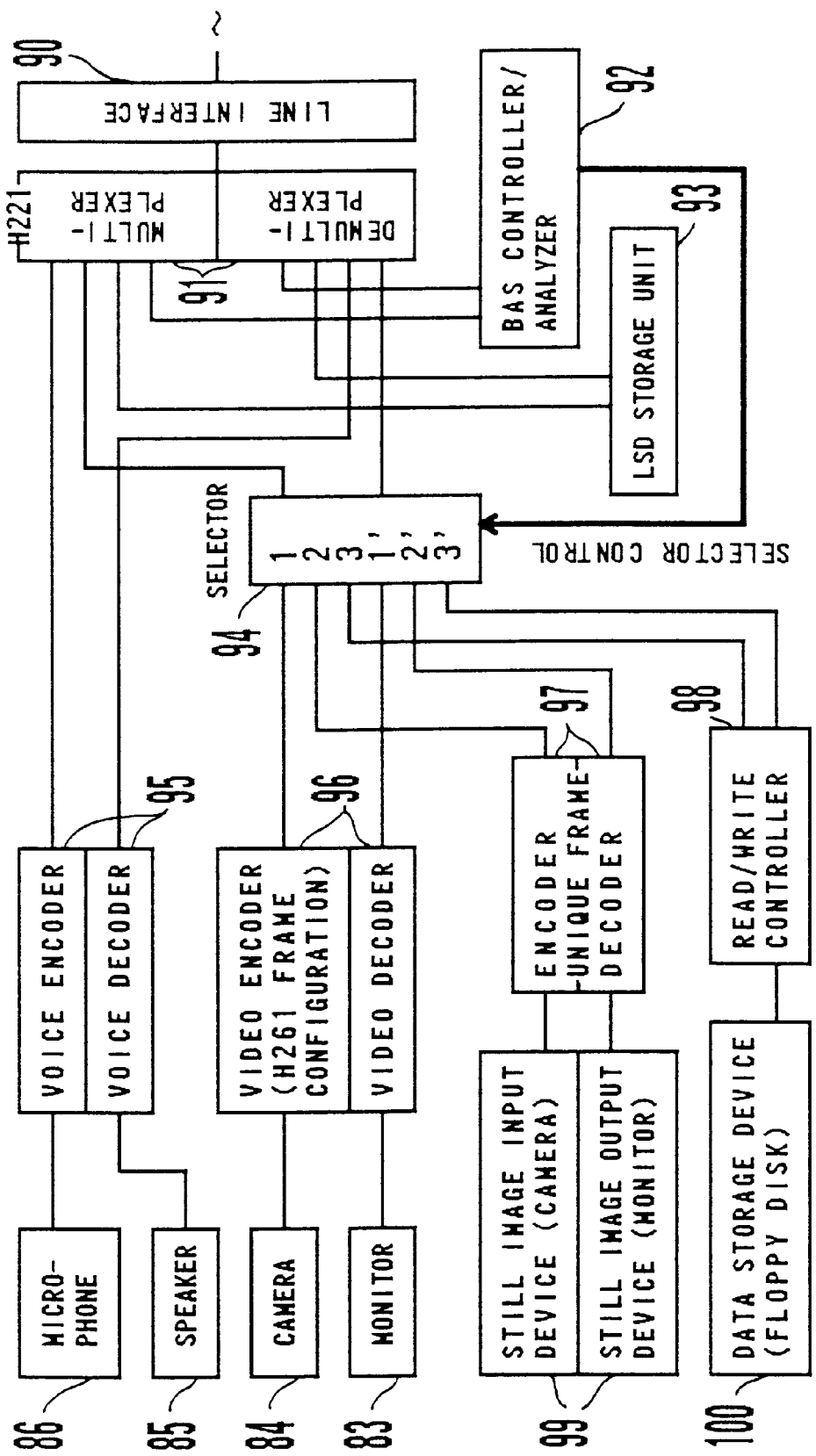
FIG. 26 is a block diagram of the terminal in the third embodiment.

FIG. 26 is a detailed block diagram of a video conference terminal, which is equipped with a line interface 90 with the MCU, a multiplexer/demultiplexer 91 for multiplexing data sent over the line into a frame or demultiplexing a frame into data, a BAS controller/analyzer 92 for handling non-standard BAS (bit rate alignment signal) commands in the H.221 standard, an LSD storage unit 93 which stores low speed data (LSD) such as control data to and/or from the MCU, a selector 94, a voice encoder/decoder 95, a video encoder/decoder 96, a unique frame encoder/decoder 97, a read/write controller 98, a still image input/output device 99, and a data storage device 100 such as a floppy disk drive. The terminal controls the transmission and reception of data to and from the MCU with commands in a unique format (ns-com), to be described later, and waits for a permission response from the MCU to a request by the terminal to send/receive data before it controls the selector 94.

To send unique data other than video conference image data to the MCU, each terminal issues a request to send unique data to the MCU. For this purpose, the above-described non-standard BAS commands and low-speed data (LSD) are used.

The MCU confirms that an image from the terminal that has made a request to send unique data is not distributed to other terminals, that is, that terminal is not the broadcasting terminal, before it sends to that terminal a response for permission to send unique data. Upon receipt of that response, the terminal switches the selector 94 from the image data position to the unique data position to thereby allow unique data to be sent. In this case, an identifier representing a data type is attached to the unique data. The MCU distinguishes the type of data by the identifier and then stores the unique data in the memory 81 of FIG. 25. At this point, the MCU assigns an arbitrary number (order) to the data stored in the memory as needed. When receiving unique data from a terminal, the MCU rejects a request by another terminal to make the terminal which is sending unique data the broadcasting terminal.

Figure 27:
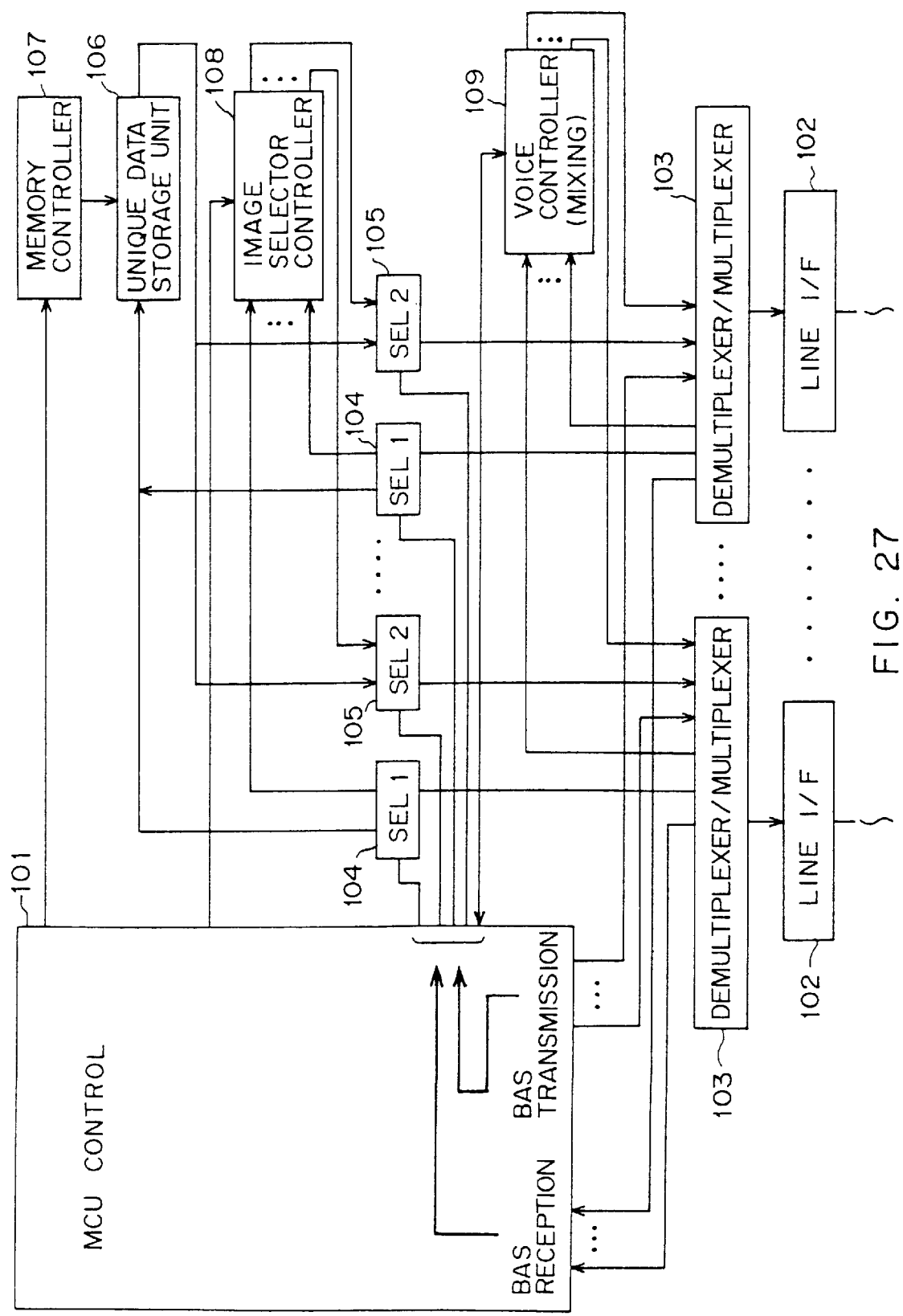
FIG. 27 is a block diagram of the multi-location conference control unit in the third embodiment.

FIG. 27 is a block diagram of the multi-location video conferencing control unit (MCU) in the third embodiment. The MCU includes an MCU controller 101 for controlling the entire MCU, line interfaces 102, demultiplexers/multiplexers 103 for separating a frame of data sent over a line into pieces of data and combining pieces of data into a frame of data, selectors 104 for selecting the destination of each piece of demultiplexed data within the MCU, selectors 105 for selecting pieces of data to be combined into a frame of data to be sent over a line, a unique data storage unit 106 for storing unique data sent from each terminal, a memory controller 107 for controlling the input and output of data to and from the unique data storage unit 106, an image selector controller 108 for accepting image data received from a terminal and distributing it to other terminals as needed, and a voice controller 109 for mixing voice signals from multiple terminals. The MCU is also responsive to a unique command (ns-com) from a terminal to switch the selectors. In response to a request by a terminal to send or receive unique data, the MCU sends a permission response to that terminal if possible, and switches the selectors 104 and 105 to the unique data position.

Normally, in FIG. 27, received image data are output from the selectors 104 to the image selector controller 108, and image data from the selector controller 108 are selected by the selectors 105 and combined into a frame of data for transmission. In contrast, when unique data is transmitted from a terminal to the MCU, the selector 104 outputs it to the unique data storage unit 106. When data stored in the unique data storage unit 106 are transmitted to another terminal, they are selected by the selector 105 and then combined into a frame of data for transmission to the destination terminal.

When a terminal wants to use data stored in the unique data storage unit 106, it makes a request to the MCU for a list of the contents of the unique data storage unit, and in response to this the MCU presents to the terminal the list based on data types and uniquely assigned numbers. The terminal then makes a request to the MCU for transmission of requested unique data. In response to the request, the MCU switches the selector 105 and sends unique data from the unique data storage unit to the terminal. The terminal switches the selector 94 of FIG. 26 and stores the received unique data into the floppy disk drive.

Figure 28:
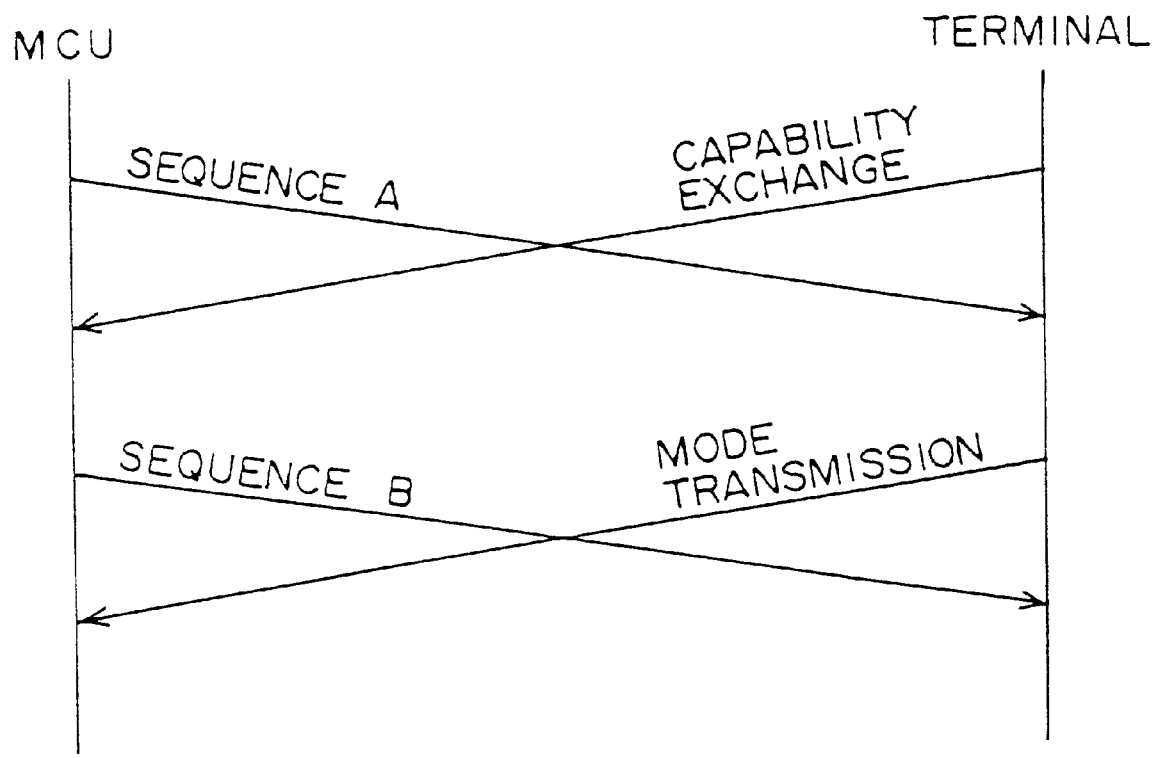
FIG. 28 is a diagram for explaining the capability exchange sequences when the terminals and the multi-location video conferencing control unit are linked.

Next, the description will be given of a procedure of transmitting unique data between the MCU and terminals in the third embodiment. In the multi-location video conferencing system, a procedure of exchanging capabilities is performed first prior to transmission of the unique data. FIG. 28 shows this procedure.

In the present embodiment, as shown in FIG. 28, capability exchange is carried out as sequence A in establishing the connection between a terminal and the MCU. The capability exchange conforms to the H.242 procedure of the ITU (International Telecommunication Union)—T as an international standard and the TTC (Telecommunication Technology Committee) as the Japanese domestic standard, and the non-standard capability message on H.221 is used. That is, the MCU and the terminal exchange their capabilities with each other in a format of ns-cap, N (length), national number, provider code, and unique capabilities (N-4 bytes), thereby allowing each of them to make certain whether the other has the capabilities to transmit a still image and floppy-disk data, by way of example. Here, the maximum value of N is assumed to be 255.

Communication of various control signals during a video conference is made by mode transmission in sequence B after the capability exchange. That is, as with the format of non-standard command messages, use is made of a format of ns - con, N (length), national number, provider code, and unique commands (N - 4 bytes) to communicate control requests and responses thereto with each other. In this case as well, the maximum value of N is assumed to be 255.

Before describing the procedure of transmitting unique data and allowing another terminal to read the unique data in the third embodiment, examples of commands as used in the procedure will be described. FIG. 29 shows examples of such commands.

In FIG. 29, for example, "11" in information appended to a unique BAS for the still image transmit request command can be regarded as an identification number for the command or can be taken as the still image transmit request command itself. In the latter case, S1 and S2 in the appended information can be regarded as parameters associated with the command "11".

Here, S1, S2 have a fixed length of 2 bytes, and represent the size of transfer data and the number of blocks, with 512 bytes used as one block. Consider the following command as an example of a command on the H.221 (non-standard BAS).

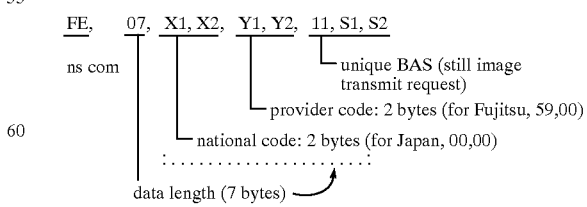

In the unique command, the additional information S1 corresponds to the second byte and S2 corresponds to the third byte. It will also be allowed to say that, as additional information in the command of "11", S1 corresponds to the first byte and S2 corresponds to the second byte.

Additional information C1, C2, . . . , Cn for the still image transmit start notification command represents a comment such as data contents using IA-5 (International Alphabet No. 5) characters. The comment is variable in length up to a maximum of 12 bytes. Here, ASCII codes or Kanji codes may be used to represent the comment and characters may be greater in length. The comment may represent anything. However, from an actual operational standpoint, the comment will be used to represent a title of transmission data.

N1, N2, . . . , Nn, additional information in the registered still image list notification command, indicate a list of data stored in the MCU in the form of data item numbers. The overall length is variable up to 250 bytes. Each of N1, N2, . . . , Nn is 1 byte, and n is limited between 0 and 250. That is, in the present embodiment, the MCU can store as many as 250 items of data. In the absence of stored data, (No)=0 is used as additional information.

N as additional information in a registered still image detail request command is the item number of a data item which is a candidate for a detail request. This information is given by the MCU as described above and its length is fixed at one byte. Additional information in other commands is the same as that described above.

Figure 30:
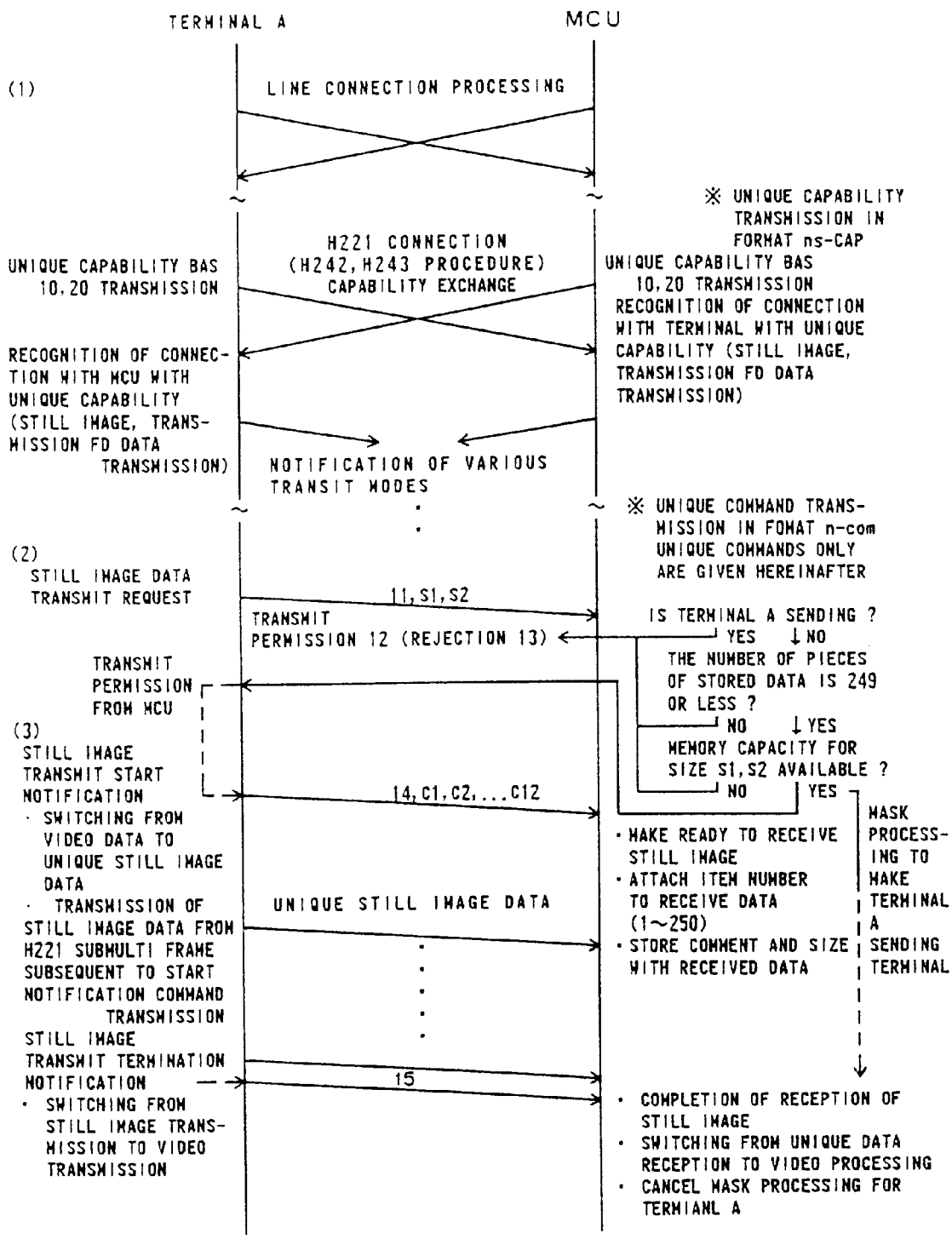
FIG. 30 shows a procedure for entering a unique still image into the multi-location video conferencing control unit.

Next, a procedure of registering unique data using the commands shown in FIG. 29 will be described. FIG. 30 shows a procedure of registering unique still images, which is also applied to registration of floppy-disk data. The unique still image registration procedure is performed in the order of steps (1), (2), (3), and (4). Here, step (1) indicates the above-described capability exchange sequence and the following steps (2), (3) and (4) indicate the actual unique still image registration procedure.

(1) In the capability exchange in the H.221 connection after line connection between a terminal A and the MCU, unique capabilities BAS are exchanged using a non-standard capability message format. Each of the terminal and the MCU makes certain that the other has a unique capability (still image transmission, FD data transmission) and determines if the subsequent transmission of unique commands (still image transmission request, etc.) is possible or impossible. Only when each of the terminal and the MCU has made certain that the other has unique capabilities, is subsequent transmission of ns - com based unique commands BAS made.

(2) When the terminal A sends a request to transmit still image data (11, S1, S2), it sends to the MCU a transmit request command with the size (S1, S2) of transmit data appended. The data size represents the number of blocks each of 412 bytes by two bytes (HEX). Upon receipt of the command, the MCU makes a decision of whether the transmit data can be registered. That is, the MCU returns a response of transmit permission to the terminal when the following conditions are all met:

the conference is not managed with the terminal A used as an image sending terminal;

the number of stored data items is below 250; and a memory capacity corresponding to the size of data for which a request for transmit is made is available.

When the conditions are not met, the MCU returns a response of transmit rejection (13) to the terminal A.

When the MCU returns a response of transmit permission, the MCU performs a mask control so that the terminal A will not be subsequently be made an image sending terminal. That is, a request to make the terminal A an image sending terminal is rejected by the determination of an image sending terminal by voice activation and the designation of a broadcasting terminal by the chairperson in the H. 243 control of the proceedings.

(3) Upon receipt of a response of transmit permission from the MCU, the terminal A notifies the MCU of the start of data transmit (14, C1, C2, . . . , C12). At this point, the terminal may transmit the comments on transmit data as additional information.

That is, information, such as a data name, is transmitted by 12 bytes (maximum length) of IA-5 characters.

After making a transmission start notification, the terminal switches its selector from video data transmission to unique still image data transmission and starts the transmission of data from the next H.221 sub-multi frame.

Upon receipt of a still image transmission start notification, the MCU switches the selector from normal video transmission to unique still image reception to make ready to store data transmitted from the terminal. The MCU stores the data with an arbitrary item number attached as well as the data size and the comment information.

(4) At the termination of transmission of still image data, the terminal sends a still image transmission termination notification (15) to the MCU. The terminal then sends normal video data from the next sub-multi frame.

Upon receipt of a still image transmission termination notification, the MCU terminates the storage of the still image and switches its selector to normal video data reception. In addition, the MCU cancels the image sending terminal mask control for the terminal A.

Figure 31:
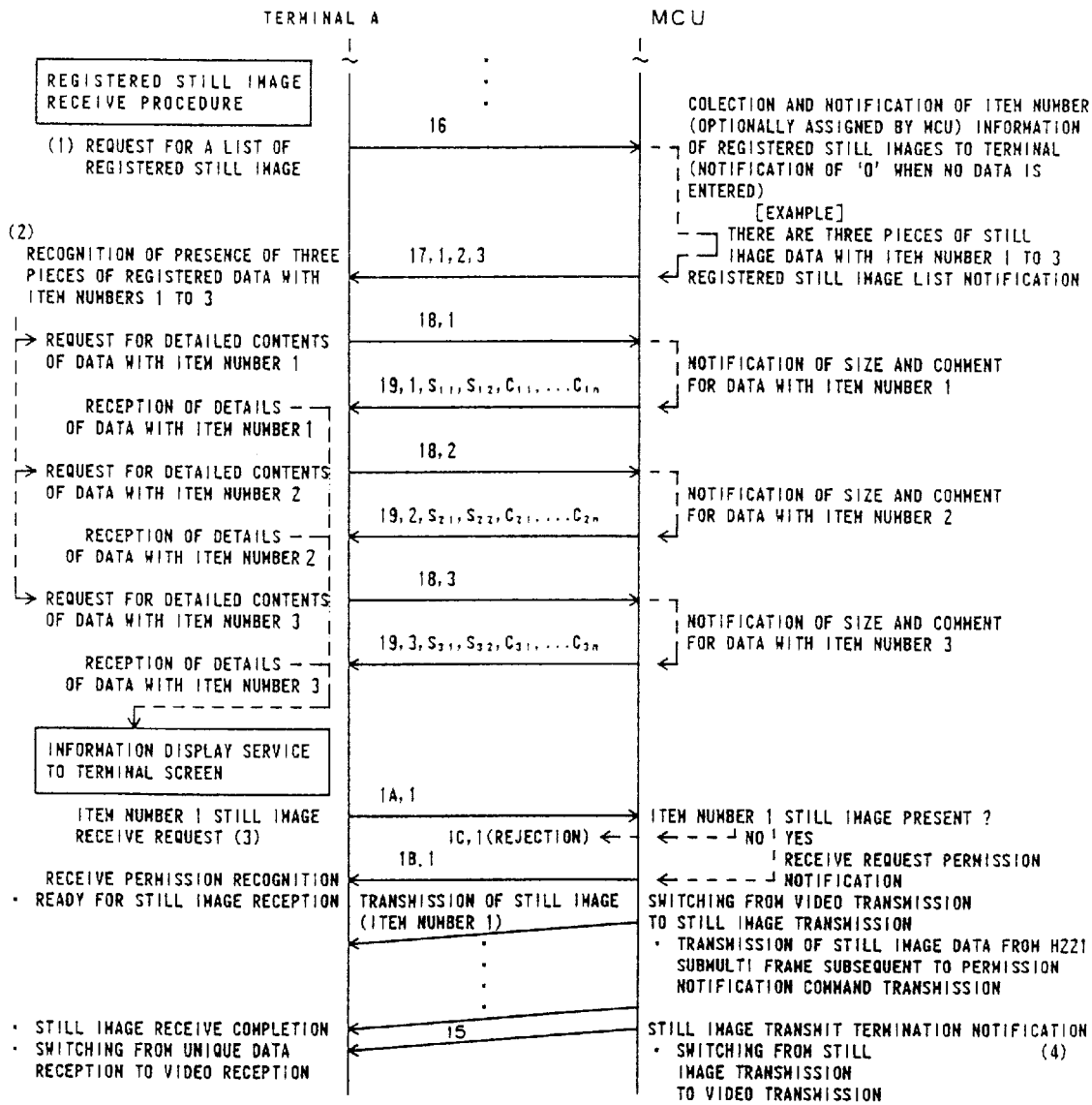
FIG. 31 shows a procedure of receiving a still image entered into the multi-location video conferencing control unit.

Next, the unique still image reception by a terminal is performed in (1) to (4) in FIG. 31.

(1) To obtain still image data stored in the MCU, a request for a list of registered still images (16) is sent.

Upon receipt of this request, the MCU collects item number information attached to stored still images and sends it to the sending terminal as registered still image list information.

For example, when three still image data with item numbers of 1, 2 and 3 are stored, information of 17, 1, 2, and 3 is sent to the terminal.

(2) On the basis of the list information, the terminal further makes requests for detailed information on the still image data. That is, requests are made such as:

a request for the detailed contents of a data with item number 1 in 18, 1, a request for the detailed contents of a data with item number 2 in 18, 2, and a request for the detailed contents of a data with item number 3 in 18, 3.

Upon receipt of a request for detailed contents, the MCU notifies the terminal of the size of still image data corresponding to an item number and comment information.

The terminal displays the information to the user through a TV screen. The user selects data to be received from the displayed information.

(3) For example, to receive the still image data numbered one, the terminal sends a request to receive the still image to the MCU in 1A, 1.

Upon receipt of a request to receive a still image, the MCU makes certain that data corresponding to the item number is present and then sends notification that the request for reception is permitted (1B, 1). After that, the MCU switches the transmission to the terminal A from the transmission of video data to the transmission of still image data and then starts the transmission of the still image data numbered one from the next H.221 sub-multi frame.

Upon receipt of the reception permission, the terminal switches from the reception of video data to the reception of still image data.

(4) At the termination of stored still image transmission, the MCU sends still image transmission termination notification (15) to the terminal and switches the transmission to the terminal A from the transmission of still image data to the transmission of video data. Upon receipt of the transmission termination notification, the terminal likewise switches the receive mode.

Figure 32:
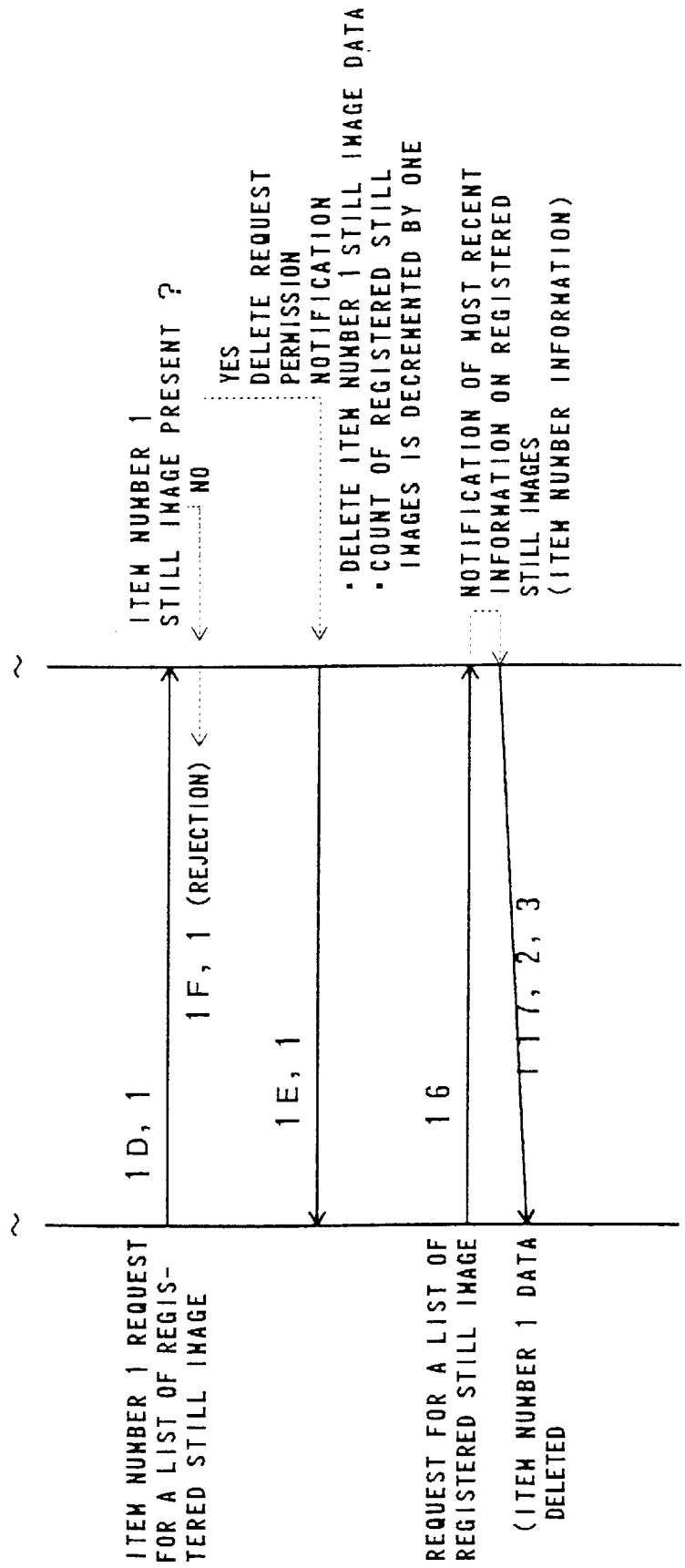
FIG. 32 shows a procedure of deleting a still image entered into the multi-location video conferencing control unit.

Finally, the deletion of registered still image data by a terminal will be described with reference to FIG. 32.

When a terminal makes a request to delete unique still image data registered in the MCU (for example, still image data item number 1), it sends 1D, 1.

Upon receipt of a deletion request, the MCU confirms the presence of data with the received item number and then deletes it. At this point, the number of registered still images is decremented by one.

As described above, the multi-location video conferencing system according to the first embodiment of the invention permits each participant in the conference to designate participants he or she wants to see and to watch them in any desired arrangement by the use of relatively-small-scale hardware. Further, a speaker's image and non-speakers' images are displayed in definitely separated portions, thereby the change of speaker is understood intuitively by each participant, and the change of speakers is displayed as slowly as needed, thereby permitting a composite image to be displayed in an easy-to-understand form.

Moreover, the second embodiment can attain the same object as the first embodiment with a smaller amount of hardware. In addition, by transmitting unused data of image data in a fixed color, the encoding efficiency can be increased and the quality of image portions to be transmitted can be improved.

Furthermore, according to the multi-location video conferencing system in which no composite image is created and an image at a broadcasting terminal is distributed to other terminals, unique data, such as floppy-disk data or the like, is transmitted from non-broadcasting terminals to a multi-location conference control unit using a video conference image data transmission band, thereby permitting a more efficient line utilization in the multi-location video conferencing system. In this case, various control signals can be transmitted between the terminals and the control unit to make a request to delete stored data in the control unit by each terminal and to distribute stored data to other terminals, permitting functions to be expanded easily.

What is claimed is:

1. In a multi-location video conferencing system a multi-image combining device for combining image data sent from video conference terminals at a plurality of locations into a composite image and sending back said composite image to said terminals comprising:

first image reduction and storage means, provided for each of said terminals, for reducing an image sent from a corresponding one of said terminals using a reduction ratio for a speaker's image and storing a reduced image;

second image reduction and storage means, provided for each of said terminals, for reducing an image sent from a corresponding one of said terminals using a reduction ratio for a non-speaker's image and storing a reduced image;

image readout control means, provided for each of said second image reduction and storage means, for controlling the reading of said reduced image from a corresponding one of said second image from a corresponding one of said second image reduction and storage means reduction and storage means so that a plurality of images identical to said reduced image are displayed on one screen; and image selecting and combining means for selectively outputting one of an output of said first image reduction and storage means and an output of said second image reduction and storage means which are read under the control of said image readout control means for each of pixels forming a composite image to thereby combine images from said terminals into said composite image, said composite image being sent back to said terminals.

2. The system according to claim 1, wherein said image selecting and combining means includes select memory means for storing data as to which output of said first and second image reduction and storage means is to be selected in memory locations corresponding in position to pixels in said composite image, and said multi-image combining device further comprises control means for storing said data into said select memory means.

3. The system according to claim 2, wherein said control means is responsive to an image arrangement specify signal for specifying how images are to be arranged in a composite image from a terminal that is to receive said composite image produced by said multi-image combining device, and sets data to be stored into said select memory means.

4. The system according to claim 2, wherein said control means slowly changes data to be stored into said select memory means so as to switch between speakers' images smoothly at the time of a change of speaker in the multi-location video conference.

5. The system according to claim 4, wherein said multi-location video conferencing system includes speaker terminal detecting means for detecting the level of a voice signal from each of said terminals to detect a terminal transmitting an image of a current speaker in the multi-location video conference, and wherein said control means detects the change of speaker in response to said speaker terminal detecting means.

6. The system according to claim 2, further comprises speaker terminal detecting means for detecting a terminal transmitting an image of a current speaker in the multi-location video conference by detecting the level of a voice signal from each of said terminals, and wherein said control means sets said data to be stored in said select memory means in accordance with the results of detection by said speaker terminal detecting means so that images from terminals at which current non-speakers are located will be arranged in said composite image in the order of the numbers of times of speaking in the video conference.

7. The system according to claim 1, wherein said image selecting and combining means creates a composite image so that an image output from said first image reduction and storage means which corresponds to one of said terminals that is transmitting an image of a current speaker is displayed in said composite image and nothing is displayed in an area of said composite image in which an image output from said second image reduction and storage means corresponding to said terminal that is transmitting an image of a current speaker is to be displayed.

8. In a multi-location video conferencing system a multi-image combining device for combining image data sent from video conference terminals at a plurality of locations into a composite image and sending back said composite image to said terminals comprising:

image reduction and storage means, provided for each of said terminals, for reducing an image sent from a corresponding one of said terminals using a reduction ratio for a non-speaker's image and storing a reduced image;

image readout control means, provided for each of said image reduction and storage means, for controlling the reading of said reduced image from a corresponding one of said image reduction and storage means so that a plurality of images identical to said reduced image from a corresponding one of said image reduction and storage means are displayed on one display screen; and image selecting and combining means for selecting a plurality of outputs, read under control of said image readout control means provided for each terminal, of said image reduction and storage means and an image output of a terminal that is transmitting an image of a current speaker for each of pixels forming a composite image to thereby combine images from said terminals into said composite image, said composite image being sent back to said terminals.

9. The system according to claim 8, wherein a terminal that transmits an image forcibly fixes at a constant value that portion of image data which is discarded to display non-speakers' images from other terminals in a corresponding portion of a composite image when said composite image containing said image from said terminal as a speaker's image is created and sends said image data to said multi-image combining device.

10. The system according to claim 8, wherein said image selecting and combining means includes select memory means for storing data as to which of image outputs of said image reduction and storage means and an image output of said terminal that is transmitting an image of a speaker is to be selected in memory locations corresponding in position to pixels in said composite image, and said multi-image combining device further comprises control means for storing said data into said select memory means.

11. The system according to claim 10, wherein said control means is responsive to an image arrangement specify signal for specifying how images are to be arranged in a composite image from a terminal that is to receive said composite image produced by said multi-image combining device, and sets data to be stored into said select memory means.

12. The system according to claim 10, wherein said control means slowly changes data to be stored into said select memory means so as to switch between speakers' images smoothly at the time of a change of speaker in the multi-location video conference.

13. The system according to claim 12, further comprises speaker terminal detecting means for detecting the level of a voice signal from each of said terminals to detect a terminal transmitting an image of a current speaker in the multi-location video conference, and wherein said control means detects the change of speaker in response to said speaker terminal detecting means.

14. The system according to claim 10, further comprises speaker terminal detecting means for detecting a terminal transmitting an image of a current speaker in the multi location video conference by detecting the level of a voice signal from each of said terminals, and wherein said control means sets said data to be stored in said select memory means in accordance with the results of detection by said speaker terminal detecting means so that images from terminals at which current non-speakers are located will be arranged in said composite image in the order of the number of times of speaking in the video conference.

15. The system according to claim 8, wherein said image selecting and combining means creates a composite image so that an image output from a terminal that is transmitting an image of a current speaker is displayed in said composite image and nothing is displayed in an area of said composite image in which an image output from one of said image reduction and storage means corresponding to said terminal that is transmitting an image of a current speaker is to be displayed.

16. In a multi-location video conferencing system a multi-image combining device for combining image data sent from video conference terminals at a plurality of locations into a composite image and sending back said composite image to said terminals comprising:

first image reduction and storage means for reducing an image of a current speaker in a video conference sent from a terminal and storing a reduced image;

second image reduction and storage means, provided for each of other terminals at which participants in the conference other than said speaker are located, for reducing an image sent from a corresponding one of said terminals and storing a reduced image;

image readout control means, provided for each of said second image reduction and storage means, for controlling the reading of said reduced image from a corresponding one of said second image reduction and storage means so that a plurality of images identical to said reduced image from a corresponding one of said second image reduction and storage means are displayed on one screen; and image selecting and combining means responsive to an image arrangement specify signal from each of composite image receiving terminals for selectively outputting an output of said first image reduction and storage means and outputs of said second image reduction and storage means which are read under the control of said image readout control means for each of pixels forming a composite image to thereby combine images from said terminals into said composite image in accordance with said image arrangement specify signal, said composite image being sent back to a corresponding one of said composite image receiving terminals.

17. In a multi-location video conferencing system provided with a multi-location video conferencing control unit for switching and distributing image data sent from video conferencing terminals at a number of locations, each of said terminals comprising:

unique data input/output means for receiving unique data other than video conferencing image data to be sent to said multi-location video conferencing control unit and outputting unique data other than video conferencing image data sent from said multi-location conference control unit; and terminal-side image data/unique data select means for selecting either of video conferencing image data and unique data input from said unique data input/output means for transfer to said multi-location conference control unit using a transmission band of video conferencing image data, and said multi-location video conferencing control unit comprising:

unique data storage means for storing unique data sent from each of said terminals; and image data/unique data select means for selecting either of video conferencing image data and unique data output from said unique data storage means for transfer to said terminal side image data/unique data select means in said terminal using the transmission band of video conferencing image data, said multi-location video conferencing control unit being responsive to a request by a terminal to store unique data sent from said terminal.

18. The system according to claim 17, wherein said multi-location video conferencing control unit further comprises request permission notification means for, when a request is made by a terminal to store unique data from said terminal, making a decision as to whether said request can be accepted or not and notifying said terminal of the result of the decision.

19. The system according to claim 17, wherein each of said terminals further comprises stored data reception request means for, when it needs data stored in said unique data storage means, making a request for reception of said data.

20. The system according to claim 19, wherein, in response to said stored data reception request by a terminal, said image data/unique data select means in said multi-location video conferencing control unit sends unique data to said terminal which has made said request.

21. The system according to claim 19, wherein said multi-location video conferencing control unit further comprises request permission notification means for, when a request is made by a terminal to store unique data from said terminal, making a decision as to whether said request can be accepted or not and notifying said terminal of the result of the decision.

22. The system according to claim 17, wherein each of said terminals further comprises stored data deletion request means for making a request to delete stored data in said unique data storage means in said multi-location video conferencing control unit.

23. The system according to claim 22, wherein said multi-location video conferencing control unit further comprises request permission notification means for, when a request is made by a terminal to delete stored data in said data storage means, making a decision as to whether said request can be accepted or not and notifying said terminal of the result of the decision.

24. A method of combining multiple images for use with a multi-location video conferencing system for combining image data sent from video conference terminals at a plurality of locations into a composite image and sending back the composite image to the video conferencing terminals, comprising the steps of:

reducing an image sent from each video conference terminal using a reduction ratio for a speaker's image and storing a reduced image;

reducing an image sent from each video conference terminal using a reduction ratio for a non-speaker's image and storing a reduced image;

generating a composite image by selecting corresponding to pixels in the composite image each read result, corresponding to an image from each terminal, obtained by reading an image reduced using the reduction ratio for the non-speaker's image of an image transmitted from a terminal in a format of displaying plural images on a screen, and a read result of each image reduced using the reduction ratio for the speaker's image; and outputting the composite image to a composite image receiving terminal.

25. A method of combining multiple images for use with a multi-location video conferencing system for combining image data sent from video conference terminals at a plurality of locations into a composite image and sending back the composite image to the video conferencing terminals, comprising the steps of:

reducing an image sent from each video conference terminal using a reduction ratio for a non-speaker's image and storing a reduced image;

generating a composite image by selecting corresponding to pixels in the composite image each read result, corresponding to an image from each terminal, obtained by reading an image reduced using the reduction ratio for the non-speaker's image of an image transmitted from a terminal in a format of displaying plural images on a screen, and image data transmitted from a speaker's terminals; and outputting the composite image to a composite image receiving terminal.

26. A method of combining multiple images for use with a multi-location video conferencing system for combining image data sent from video conference terminals at a plurality of locations into a composite image and sending back the composite image to the video conferencing terminals, comprising the steps of:

reducing an image sent from a speaker's terminal which is sending an image of a current speaker in a video conference and storing a reduced image;

reducing an image sent from a non-speaker's terminal which is sending an image of a participant of the video conference other than the current speaker and storing a reduced image;

generating, in response to an image combining method specification signal from a composite image receiving terminal, a composite image by selecting corresponding to pixels in the composite image each read result, corresponding to an image from each terminal, obtained by reading an image reduced using the reduction ratio for the non-speaker's image of an image transmitted from a terminal in a format of displaying plural images on a screen, and a read result of each image reduced using the reduction ratio for the speaker's image; and outputting the composite image to the composite image receiving terminal, and providing the composite image according to an instruction from the composite image receiving terminal.

27. A method of accumulating unique data for use with a multi-location video conferencing system provided with a multi-location video conferencing control unit for switching and distributing image data sent from video conferencing terminals at a number of locations, comprising the steps of:

receiving, by a terminal which is not transmitting a video conference image among the video conferencing terminals, unique input data other than image data of a video conference;

transferring by the terminal the received unique data using a transfer band for video conference image data to the multi-location video conferencing control unit; and accumulating by the multi-location video conferencing control unit the unique data transferred from the terminal.

28. The method according to claim 27, wherein one of said video conferencing terminals requests a transfer of the unique data accumulated by the multi-location video conferencing control unit;

said multi-location video conferencing control unit transfers the requested unique data to the video conferencing terminal using a transfer band of the video conference image data; and said video conferencing terminal outputs the transferred unique data.

* * * * *